United States Patent
Fukui et al.

(10) Patent No.: US 8,089,211 B2
(45) Date of Patent: Jan. 3, 2012

(54) PLASMA DISPLAY PANEL AND METHOD FOR MANUFACTURING THE SAME

(75) Inventors: Yusuke Fukui, Osaka (JP); Masaharu Terauchi, Hyogo (JP); Takuji Tsujita, Osaka (JP)

(73) Assignee: Panasonic Corporation, Osaka (JP)

( * ) Notice: Subject to any disclaimer, the term of this patent is extended or adjusted under 35 U.S.C. 154(b) by 382 days.

(21) Appl. No.: 12/302,263

(22) PCT Filed: May 31, 2007

(86) PCT No.: PCT/JP2007/061078
§ 371 (c)(1),
(2), (4) Date: Nov. 24, 2008

(87) PCT Pub. No.: WO2007/139183
PCT Pub. Date: Dec. 6, 2007

(65) Prior Publication Data
US 2009/0140652 A1    Jun. 4, 2009

(30) Foreign Application Priority Data
May 31, 2006    (JP) ................................. 2006-151295

(51) Int. Cl.
*H01J 17/49* (2006.01)
(52) U.S. Cl. ...................................................... 313/586
(58) Field of Classification Search ........... 313/582–587
See application file for complete search history.

(56) References Cited

U.S. PATENT DOCUMENTS

| | | | |
|---|---|---|---|
| 5,613,889 A | 3/1997 | Nosker et al. | |
| 5,993,543 A | 11/1999 | Aoki et al. | |
| 7,161,148 B1 | 1/2007 | Givargizov et al. | |
| 7,166,961 B2 | 1/2007 | Park | |
| 7,253,561 B2 | 8/2007 | Kim et al. | |
| 7,292,537 B2 | 11/2007 | Charcranoon | |
| 7,399,987 B1 | 7/2008 | Viscor et al. | |
| 2004/0130267 A1 | 7/2004 | Kajiyama et al. | |
| 2005/0088095 A1 | 4/2005 | Kim | |
| 2005/0264487 A1 | 12/2005 | Tokunaga et al. | |
| 2007/0013306 A1 | 1/2007 | Hai et al. | |

FOREIGN PATENT DOCUMENTS

| | | |
|---|---|---|
| JP | 5-234519 | 9/1993 |
| JP | 6-162920 | 6/1994 |
| JP | 7-192630 | 7/1995 |

(Continued)

OTHER PUBLICATIONS

Russian Application No. 2008152809 Notice of Allowance dated Apr. 7, 2011, 18 pages with English translation.

(Continued)

*Primary Examiner* — Joseph L Williams

(57) ABSTRACT

"Discharge delay" and "dependence of discharge delay on temperatures" are solved by improving a protective layer, thus a PDP can be driven at a low voltage. Furthermore, the PDP can display excellent images by suppressing "dependence of discharge delay on space charges." Liquid-phase magnesium alkoxide ($Mg(OR)_2$) or acetylacetone magnesium ate whose purity is 99.95% or more is prepared, and is hydrolyzed by adding a small amount of acids to the solution. Thus, a gel of magnesium hydroxide that is a magnesium oxide precursor is formed. Burning the gel in atmosphere at 700° C. or more produces powder containing MgO particles 16a-16d having the NaCl crystal structure with (100) and (111) crystal faces or with (100), (110) and (111) crystal faces. By pasting the powder on a dielectric layer 7 or a surface layer 8, the MgO powder 16 is formed so as to serve as the protective layer.

21 Claims, 10 Drawing Sheets

FOREIGN PATENT DOCUMENTS

| | | |
|---|---|---|
| JP | 7-296718 | 11/1995 |
| JP | 8-287823 | 11/1996 |
| JP | 8-287833 | 11/1996 |
| JP | 9-106765 | 4/1997 |
| JP | 9106762 | 4/1997 |
| JP | 9-185945 | 7/1997 |
| JP | 9-208851 | 8/1997 |
| JP | 10-125237 | 5/1998 |
| JP | 2000-156153 | 6/2000 |
| JP | 2001-118518 | 4/2001 |
| JP | 2002-255544 | 9/2002 |
| JP | 2004-134407 | 4/2004 |
| JP | 2004-273452 | 9/2004 |
| JP | 2004-289791 | 10/2004 |
| JP | 2005-129522 | 5/2005 |
| JP | 2006-54158 | 2/2006 |
| JP | 2006-127864 | 5/2006 |
| JP | 2006-318826 | 11/2006 |
| JP | 2007-91525 | 4/2007 |
| RU | 2178598 | 1/2002 |
| RU | 2 206 924 | 6/2003 |
| RU | 2224327 | 2/2004 |
| RU | 2240623 | 11/2004 |
| WO | 2005/031782 | 4/2005 |
| WO | WO2005/031782 | 4/2005 |

OTHER PUBLICATIONS

European Extended Search Report for Application No. 07767002.4 dated Jun. 22, 2010, 6 pages.

European Extended Search Report for Application No. 07767001.6 dated Jun. 22, 2010, 6 pp.

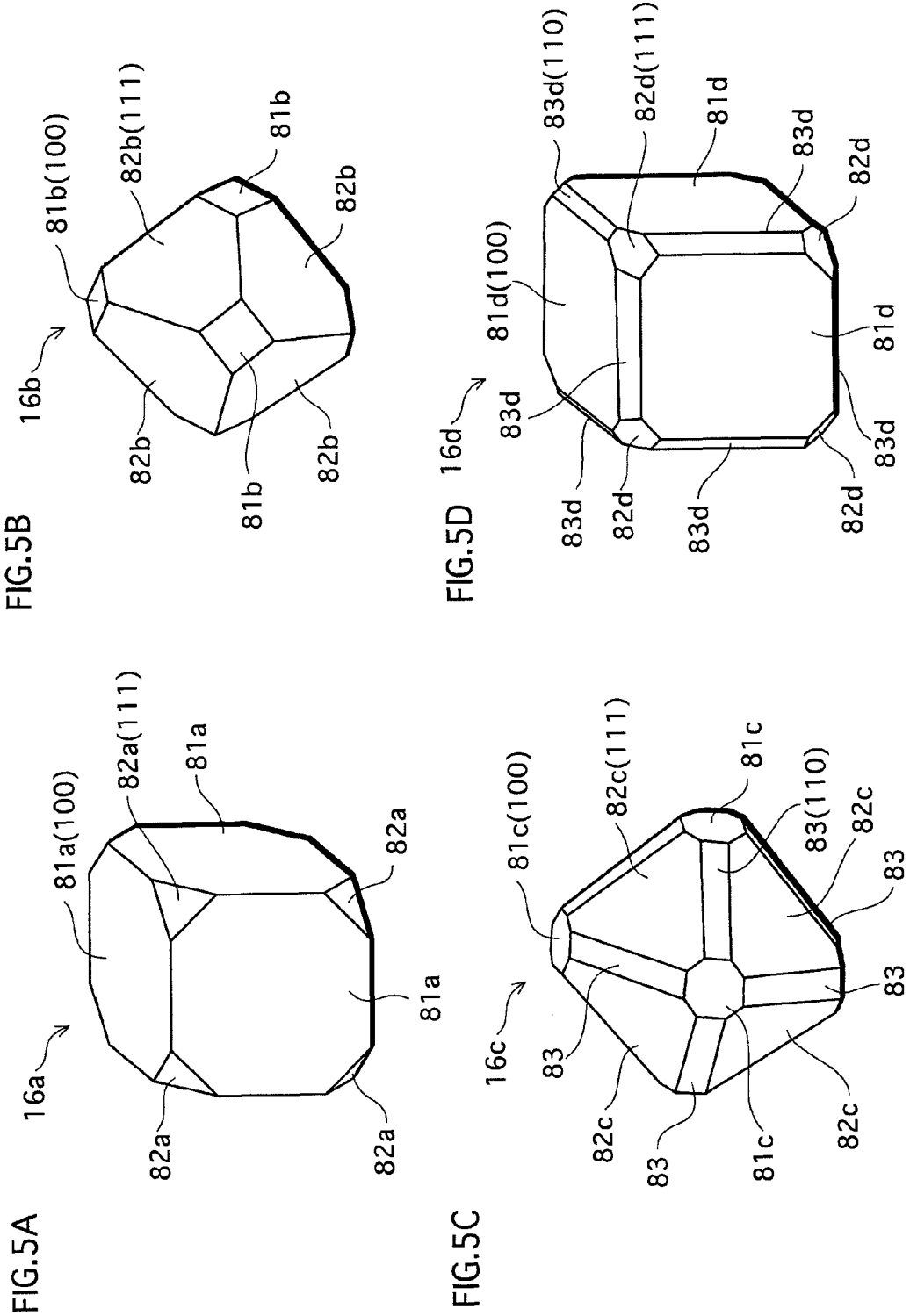

FIG.8B  MgO PARTICLE 16b
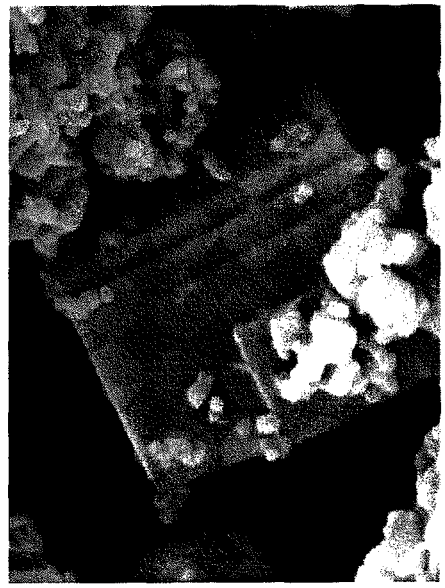
FIG.8D  MgO PARTICLE FORMED BY GAS-PHASE METHOD
FIG.8A  MgO PARTICLE 16a
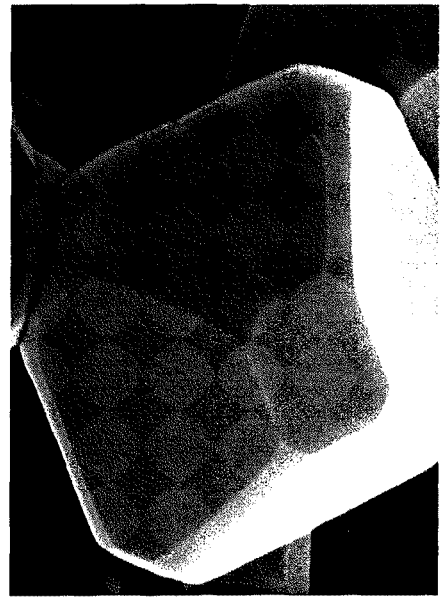
FIG.8C  MgO PARTICLE 16c

PLASMA DISPLAY PANEL AND METHOD FOR MANUFACTURING THE SAME

TECHNICAL FIELD

The present invention relates to a plasma display panel and a manufacturing method therefor. The present invention relates more particularly to a plasma display panel having a dielectric layer covered with an improved protective layer, and a method for manufacturing the same.

BACKGROUND ART

A plasma display panel (herein after referred to as PDP) is a flat display device that takes advantage of radiation caused by gas discharge. The PDP has been in practical use in many fields such as an image display device and a public information display device, since the PDP can achieve high-speed display and be produced in a large size. There are two types of PDP, a direct-current (DC) type and an alternating-current (AC) type. Especially, the AC surface discharge PDP possesses a high technological potential for realizing a long life and a large-screen display, and therefore has been commercialized.

FIG. 10 is a schematic view showing a structure of a discharge cell (display cell), or a discharge unit, of a general AC PDP. A PDP 1x shown in FIG. 10 is constituted from a front panel 2 and a back panel 9 that are assembled together. The front panel 2 includes a front panel glass 3. A plurality of display electrode pairs 6 each composed of a scan electrode 5 and a sustain electrode 4 that are disposed on the surface of the front panel glass 3. A dielectric layer 7 and a surface layer 8 are layered in the stated order to cover the display electrode pairs 6. The scan electrode 5 and the sustain electrode 4 are respectively composed of a transparent electrodes 51 and 41 and bus lines 52 and 42 layered thereon.

The dielectric layer 7 is made of low-melting glass whose softening point is approximately 550 C.°-600 C.°, and has a current limiting function that is peculiar to the AC PDP.

The surface layer 8 protects the dielectric layer 7 and the display electrode pairs 6 from ion bombardment as a result of plasma discharge. The surface layer 8 also efficiently emits secondary electrons and lowers a firing voltage. Generally, magnesium oxide (Mgo) that has high secondary electron emission properties, high sputtering resistance, and high optical transparency is used to form the surface layer 8 with a thickness of approximately 0.5 μm-1 μm using the vacuum deposition method (Patent Documents 1 and 2) or the printing method (Patent Document 3). Note that a protective layer that has the identical structure with the surface layer 8 may be arranged in order to have the secondary electron emission properties and to protect the dielectric layer 7 and the display electrode pairs 6.

On the other hand, a back panel 9 includes a back panel glass 10 and a plurality of data (address) electrodes 11 disposed thereon so as to intersect the display electrode pairs 6 substantially at a right angle in plan view. The data electrodes 11 are used for writing image data in the discharge cells. On the back panel glass 10, a dielectric layer 12 made of low-melting glass is disposed to cover the data electrodes 11. Disposed on the dielectric layer 12 at a given height are barrier ribs 13 made of low-melting glass. More specifically, the barrier ribs 13 are composed of pattern parts 1231 and 1232 that are combined to form a grid pattern to partition a discharge space 15 into a plurality of cells. Phosphor ink of red (R), green (G) and blue (B) colors are applied to the surface of the dielectric layer 12 and the lateral surfaces 13 of the barrier ribs, and burned to form phosphor layers 14 (phosphor layers 14R, 14G and 14B).

The front panel 2 and the back panel 9 are sealed together around edge portions thereof such that the display electrode pairs 6 are orthogonal to the data electrodes 11 via the discharge space 15. In the sealed discharge space 15, a rare gas mixture such as xenon-neon or xenon-helium is enclosed as a discharge gas at some tens of kilopascals. The above is the structure of the PDP 1x.

In order to display an image on the PDP, a method for displaying gradation of the image by dividing one field of the image into a plurality of subfields (S.F.) (e.g. intra-field time division grayscale display method) is used.

In recent years, there have been demand for low-power appliances, and similar demand is made for the PDP as well. In a high-definition PDP, the discharge cells are miniaturized and accordingly the number of the required cells increases. Thus, in order to generate an address discharge more securely, the operating voltage needs to be risen.

A conventional PDP has the following problems.

The first problem is that, when a pulse is applied to the display electrodes, a "discharge delay" which is a time lag between pulse application and discharge generation evidently occurs. Recently, in the field of displays including the PDP, the PDP tends to have high-definition pixels, and therefore the number of scan lines increases. A full-high-vision TV, for example, has more than twice as many scan lines as a conventional NTSC TV. Thus, as the higher-definition PDP has been developed, the PDP needs to be driven at a higher speed. For the high-speed drive, it is necessary for a width of a data pulse applied to the address period to be narrowed down. However, when the PDP is driven at the high speed by applying the narrowed width of data pulse, there is a smaller chance that the discharge is completed in duration of the narrowed pulse. Therefore, there is a risk that some of the discharge cells are not addressed properly thereby failing to light.

The second problem is that the temperature dependency on discharge delay increases with increase in Xe gas concentration in the discharge gas. More specifically, a high content of the Xe gas causes the discharge delay to be more dependent on temperatures, especially at a low temperature. Thus, the occurrence of the discharge delay becomes more problematic. This problem is actually crucial in the initial stage of driving the PDP.

The third problem is that the higher the concentration of Xe gas in the discharge gas is, the more dependent on the number of sustain pulses the discharge delay is (dependence of discharge delay on space charges). The discharge delay occurs more frequently when the number of pulses is small. For example, when the number of pulses in a subfield is relatively small, the discharge delay occurs more frequently.

To solve the above problems, several approaches have been made to reform the MgO, for example, by changing the crystal structure of the MgO protective layer or adding (i) Fe, Cr and V, or (ii) Si and Al to the MgO.

Patent Document 5 discloses the following to reduce the discharge delay. The MgO protective layer is formed with use of a gas-phase method on the dielectric layer or on the MgO deposition layer that is formed by a vapor deposition method or sputtering method. Alternatively, MgO powder that is formed by the gas-phase method is arranged on the dielectric layer.

Other approaches have been made to solve problems associated with the dependence of discharge delay on temperatures (discharge delay especially in a low temperature range) as follows. Patent Document 6 discloses an attempt to optimize an amount of Si that is added to MgO, and Patent Document 7 discloses another attempt such as adding Fe, Ca, Al, Ni and K as well as Si.

[Patent Document 1] Japanese Laid-Open Patent Application Publication No. H5-234519
[Patent Document 2] Japanese Laid-Open Patent Application Publication No. H8-287833
[Patent Document 3] Japanese Laid-Open Patent Application Publication No. H7-296718
[Patent Document 4] Japanese Laid-Open Patent Application Publication No. H10-125237
[Patent Document 5] Japanese Laid-Open Patent Application Publication No. 2006-54158
[Patent Document 6] Japanese Laid-Open Patent Application Publication No. 2004-134407
[Patent Document 7] Japanese Laid-Open Patent Application Publication No. 2004-273452

DISCLOSURE OF THE INVENTION

Problems the Invention is Attempting to Solve

However, none of the above conventional techniques duly solves all the problems of the "discharge delay," "dependence of discharge delay on temperatures (especially at low temperatures)", and the "dependence on the number of pulses (dependence of discharge delay on space charges)," both occurred as a result of the high Xe content.

Having these problems, the state-of-the-art PDP still has room for improvement.

The present invention is conceived in view of the above problems, and aims to solve both problems of the "discharge delay" and the "dependence of discharge delay on temperatures" by reforming the protective layer.

In addition to the solutions for the above problems, the present invention also aims to provide a PDP that exhibits excellent display performance by suppressing the "dependence of discharge delay on space charges."

Means for Solving the Problems

To solve the above problems, the present invention provides a plasma display panel having a first substrate and a second substrate that oppose each other with a discharge space there between and are sealed together around edge portions thereof, the first substrate including electrodes and a dielectric layer that are disposed thereon in the stated order, wherein on or above a surface of the dielectric layer that faces the discharge space, powder substantially made of magnesium oxide particles each having a (100) crystal face and a (111) crystal face is disposed.

Herein, the powder may be disposed directly on the surface of the dielectric layer. In addition, a surface layer made of a metallic oxide may be disposed on the surface of the dielectric layer. The metallic oxide is at least one selected from magnesium oxide, calcium oxide, barium oxide, and strontium oxide. In addition, the powder may be disposed on a surface of the surface layer that faces the discharge space. The magnesium oxide particles may include particles that are partially embedded in the surface layer so that each magnesium oxide particle is exposed to the discharge space.

The magnesium oxide particles may include particles each having a hexahedral structure with at least one truncated surface. Herein, each hexahedral particle has a main surface which is the (100) crystal face and the truncated surface which is the (111) crystal face. The magnesium oxide particles may include particles each having an octahedral structure with at least one truncated surface. In this case, each octahedral particle may have a main surface which is the (111) crystal face and the truncated surface which is the (100) crystal face.

The magnesium oxide particles may include particles each having a sodium chloride type crystal structure, and each sodium chloride particle is a tetrakaidecahedron that has six surfaces each of which is the (100) crystal face and eight surfaces each of which is the (111) crystal face. Each tetrakaidecahedral magnesium oxide particle may have a main surface which is the (100) crystal face and a truncated surface which is the (111) crystal face. Alternatively, each tetrakaidecahedral magnesium oxide particle may have a main surface which is the (111) crystal face and a truncated surface which is the (100) crystal face. Note that it is desirable that the powder has been formed by burning a magnesium oxide precursor.

Effects of the Invention

According to the present invention with the above structure, the MgO powder is characterized by the Mgo particles having the (100) crystal face and the (111) crystal face (herein after, referred to as "two specific crystal faces").

The (100) crystal face, with its lowest surface free energy, barely absorbs impurity gas (water, hydrocarbon, carbon dioxide, etc.) in a wide temperature range from a low temperature to a temperature equal to or higher than a normal temperature. Thus, the (100) crystal face stably emits secondary electrons at a low temperature at which impurity gas is easily absorbed. Furthermore, the (111) crystal face has a large secondary electron emission coefficient, and therefore smoothly emits secondary electrons at a temperature equal to or higher than a normal temperature. Thus, disposing the MgO particles with the two specific crystal faces on the dielectric layer ensures a synergistic effect between the properties of each crystal face, enabling the two specific crystal faces efficiently and stably to emit secondary electrons in the wide temperature range. Consequently, the PDP in accordance with the embodiments of the present invention is able to suppress the "discharge delay," "dependence of discharge delay on temperatures" and in the wide temperature range, and therefore can be expected to display high-definition images.

Note that the MgO powder in accordance with the present invention may include MgO particles each having the (100) crystal face, the (110) crystal face and the (111) crystal face (herein after, referred to as "three specific crystal faces") besides the MgO particles having the two specific crystal faces. The MgO particles having the three specific crystal faces are expected to produce similar effects as the MgO particles having the two specific crystal faces. In addition to the effects, the MgO particles having the three specific crystal faces are expected to improve dependence of discharge delay on space charges.

BRIEF DESCRIPTION OF THE DRAWINGS

FIGS. 5A, 5B, 5C and 5D are views each showing the shape of each magnesium oxide particle;

FIGS. 8A, 8B, 8C and 8D each show a photo of the shape of the magnesium oxide particle;

Figure 1:
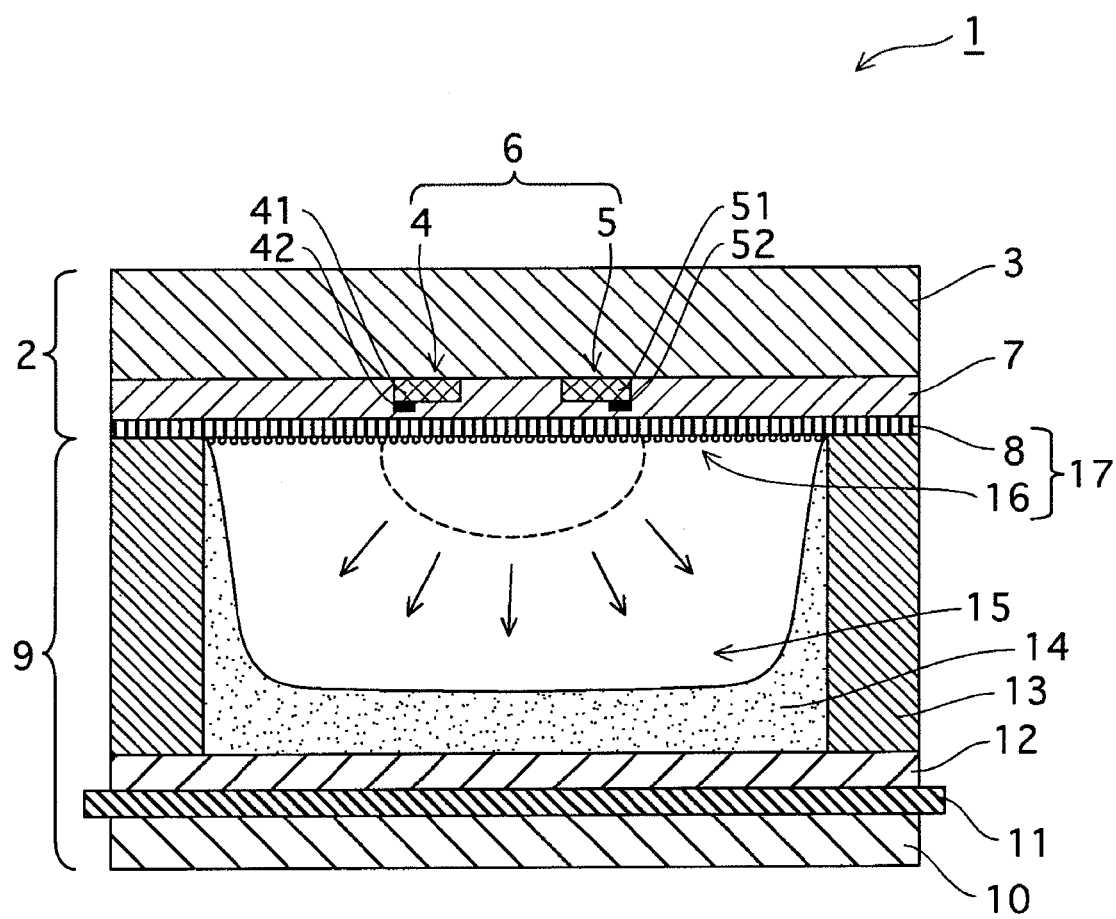
FIG. 1 is a cross-sectional view showing the structure of a PDP in accordance with Embodiment 1 of the present invention.

| Reference Numerals | |
|---|---|
| 1, 1a, 1x | PDP |
| 2 | front panel |
| 3 | front panel glass |
| 4 | sustain electrode |
| 5 | scan electrode |
| 6 | display electrode pair |
| 7, 12 | dielectric layer |
| 8 | surface layer |
| 9 | back panel |
| 10 | back panel glass |
| 11 | data (address) electrode |
| 13 | barrier rib |
| 14 | phosphor layer |
| 15 | discharge space |
| 16a | MgO particle having two specific crystal faces |
| 16b | MgO particle having two specific crystal faces |
| 16c | MgO particle having three specific crystal faces |
| 16d | MgO particle having three specific crystal faces |
| 16a1, 16a2 | variation of MgO particle having two specific crystal faces |
| 16b1, 16b2 | variation of MgO particle having two specific crystal faces |
| 16c1 | variation of MgO particle having three specific crystal faces |
| 16d1 | variation of MgO particle having three specific crystal faces |
| 16 | MgO powder |
| 17 | protective layer |

BEST MODE FOR CARRYING OUT THE INVENTION

The following describes preferred embodiments and examples of the present invention. Note that the present invention is never limited to these and various changes may be made as necessary without departing from the technical scope of the present invention.

Embodiment 1

Structure of PDP

Figure 10:
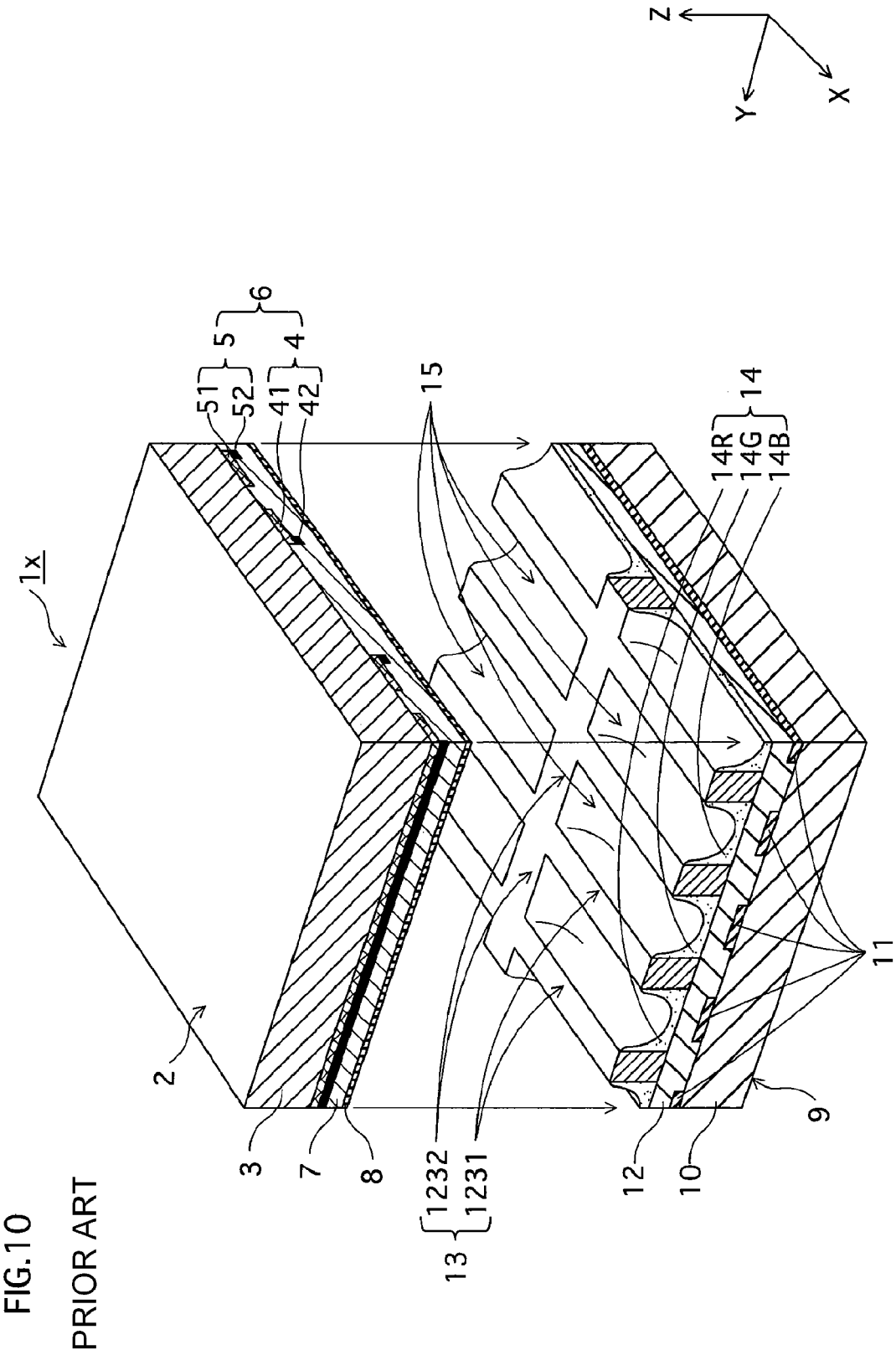
FIG. 10 is across-sectional view showing the structure of a conventional PDP.

FIG. 1 is a schematic sectional view of a PDP 1 in accordance with Embodiment 1 of the present invention, the section being taken along the x-z plane. The structure of the PDP 1 is basically identical with that of a conventional PDP (FIG. 10) except for the structure in the vicinity of the protective layer.

The PDP 1 is an AC PDP with a 42-inch screen in conformity with the NTSC specification. The present invention may be, of course, applied to other specifications such as XGA and SXGA. The applicable specifications of the high-definition PDP that is able to display images at a higher resolution than an HD (high-definition) PDP are PDPs with a size of 37, 42, and 50 inches having 24×720 (pixels), 1024×768 (pixels), and 1366×768 (pixels), respectively. In addition, such a PDP is also applicable to display images at higher resolution than the PDP 1. Examples of a PDP having higher-definition pixels than the HD PDP include a full HD PDP with 1920×1080 (pixels).

As shown in FIG. 1, the PDP 1 is composed of substantially two members that are a first substrate (front panel 2) and a second substrate (back panel 9) that oppose each other in face-to-face relationship.

The front panel 2 includes a front panel glass 3 as its substrate. On one main surface of the front panel glass 3, a plurality of electrode pairs 6 (each composed of a scan electrode 5 and a sustain electrode 4) are each disposed at a given discharge gap (75 µm) there between. Each electrode is composed of transparent electrode 51 or 41 and bus line 52 or 42 layered thereon. The transparent electrodes 51 and 41 in a stripe pattern (each transparent electrode is 0.1 µm thick, 150 µm wide) are made of transparent conductive materials such as indium tin oxide (ITO), zinc oxide (ZnO), and tin oxide ($SnO_2$). The bus lines 52 and 42 (7 µm thick, 95 µm wide) are made of an Ag thick film (2 µm-10 µm thick), an Al thin film (0.1 µm-1 µm thick), a Cr/Cu/Cr layered thin film (0.1 µm-1 µm thick) or the like. These bus lines 52 and 42 reduce the sheet resistance of the transparent electrodes 51 and 41.

The term, "thick film," is a film that is formed with various kinds of thick-film processing. In the thick-film processing, a film is formed by applying a paste and the like containing the conductive materials and burning the paste. The term, "thin film," is a film that is formed by various kinds of thin-film processing using vacuum processing such as a sputtering method, ion plating method, or electron-beam deposition method.

On the entire surface of the front panel glass 3 where the display electrode pairs 6 are disposed, a dielectric layer 7 is formed with use of a screen printing method. The dielectric layer 7 is made of low-melting glass (35 µm thick) that contains lead oxide (PbO), bismuth oxide ($Bi_2O_3$) or phosphorus oxide ($PO_4$) as the principal component.

The dielectric layer 7 has a current limiting function that is peculiar to the AC PDP, which is why the AC PDP can realize a longer life than the DC PDP.

On the surface of the dielectric layer 7 that faces the discharge space, the surface layer 8 with a thickness of approximately 1 µm is layered. On the surface of the surface layer 8, MgO powder 16 is disposed. The surface layer 8 and the MgO powder 16 constitute a protective layer 17 disposed on the dielectric layer 7.

The surface layer 8 is a thin film to protect the dielectric layer 7 from ion bombardment during discharge and to lower a firing voltage. The surface layer 8 is made of MgO material that has high sputtering resistance and a high secondary electron emission coefficient γ. The MgO material used in the embodiments of the present invention also has even higher optical transparency and electric insulation. On the other hand, as shown in FIGS. 5A-5D, the MgO powder 16 is made up of MgO particles 16a-16d each having a crystal structure with either one of the "two specific crystal faces" and the "three specific crystal faces." The detail of the MgO powder 16 is described later.

Note that, in FIG. 1, the MgO powder 16 that is disposed on the surface of the surface layer 8 is schematically shown in a larger size than the actual size for clearer explanation.

On the main surface of the back panel glass 10 that is the substrate of the back panel 9, data electrodes 11 each with a width of 100 µm are formed in a stripe pattern having a gap (360 μm) there between. The data electrodes 11 are adjacent to each other in the y direction, and each extend in the x direction longitudinally. The data electrodes 11 are made up of any one of an Ag thick film (2 μm-10 μm thick), an Al thin film (0.1 μm-1 μm thick), a Cr/Cu/Cr layered thin film (0.1 μm-1 μm thick) and the like. The dielectric layer 12 with a thickness of 30 μm is disposed on the entire surface of the back panel glass 9 to cover the data electrodes 11.

On the dielectric layer 12, the grid-shaped barrier ribs 13 (approximately 110 μm high and 40 μm wide) are each disposed above the gap between the adjacent data electrodes 11. The barrier ribs 13 prevent erroneous discharge or optical crosstalk by partitioning the discharge cells.

On the lateral surfaces of the barrier ribs 13 and on the surface of the dielectric layer 12 between the lateral surfaces, phosphor layers 14 of red (R), green (G) and blue (B) colors are formed for color display. Note that the dielectric layer 12 is inessential and that the phosphor layer 14 may directly cover the data electrodes 11.

The front panel 2 and the back panel 9 are disposed such that the data electrodes 11 and the display electrode pairs 6 are orthogonal to each other in plan view. The edge portions around the panels 2 and 9 are sealed with glass frit. In the space between the panels 2 and 9, a discharge gas composed of inert gases such as He, Xe and Ne is enclosed at a given pressure.

Between the barrier ribs 13 is a discharge space 15. Where the adjacent display electrode pair 6 intersects the data electrode 11 via the discharge space 15 corresponds to a discharge cell (also referred to as a "sub-pixel") that functions to display images. The discharge cell pitch is 675 μm in the x direction and 300 μm in the y direction. Three of the adjacent discharge cells whose colors are red, green and blue compose one pixel (675 μm×900 μm).

Figure 2:
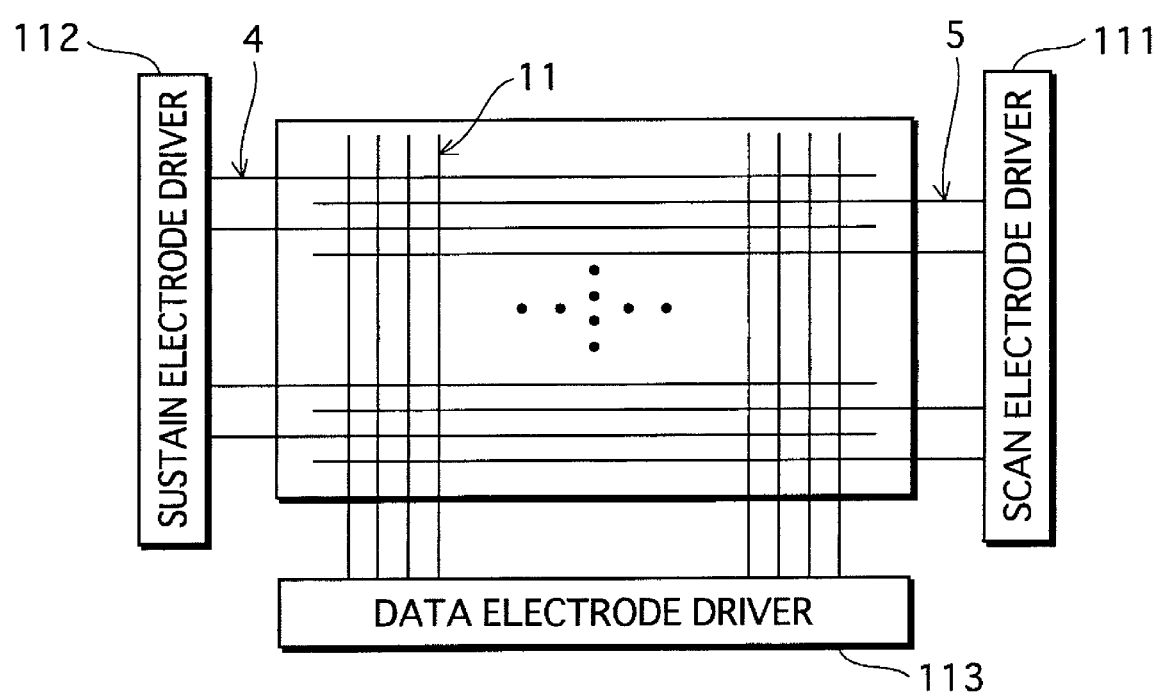
FIG. 2 is a schematic view showing a relation between electrodes and drivers.

As shown in FIG. 2, outside the panels, the scan electrodes 5, the sustain electrodes 4 and the data electrodes 11 are respectively connected to a scan electrode driver 111, a sustain electrode driver 112 and a data electrode driver 113 that are included in a driving circuit.

(Driving of PDP)

As soon as the PDP 1 with the above structure is driven, a heretofore-known driving circuit (unshown) including the drivers 111-113 applies an AC voltage ranging from tens to hundreds of kilohertz between the display electrode pairs 6 to selectably generate discharge in given discharge cells. As a result, ultra violet rays (shown as the dotted lines and the arrows in FIG. 1) including resonance lines with wavelengths of mainly 147 nm emitted by the excited Xe atoms and molecular lines with wavelengths of mainly 172 nm emitted by the excited Xe molecules irradiate the phosphor layers 14. Accordingly, the phosphor layers 14 are excited to emit visible light. The visible light transmits the front panel 2, and radiates through the front panel 2.

As an example of the driving, the intra-field time division grayscale display method is adopted. This method divides one field of an image into a plurality of subfields (S.F.), and further divides each subfield into a plurality of periods. One subfield is divided into four periods: (1) an initialization period in which all discharge cells are reset; (2) an address period in which discharge cells are selectively addressed for display according to input data; (3) a sustain period in which a sustain discharge is generated in the discharge cells that are addressed to display the images; and (4) an erase period in which wall charges generated by the sustain discharge are erased.

In each subfield, the following occurs so that the PDP 1 emits light to display an image. In the initialization period, an initialization pulse resets wall charges in all discharge cells of the entire panel. In the address period, an address discharge is generated in the discharge cells that are intended to light. Subsequently in the sustain period, an AC voltage (sustain voltage) is applied to all the discharge cells simultaneously. Thus, the sustain discharge is generated in the given length of time so as to display the image.

Figure 3:
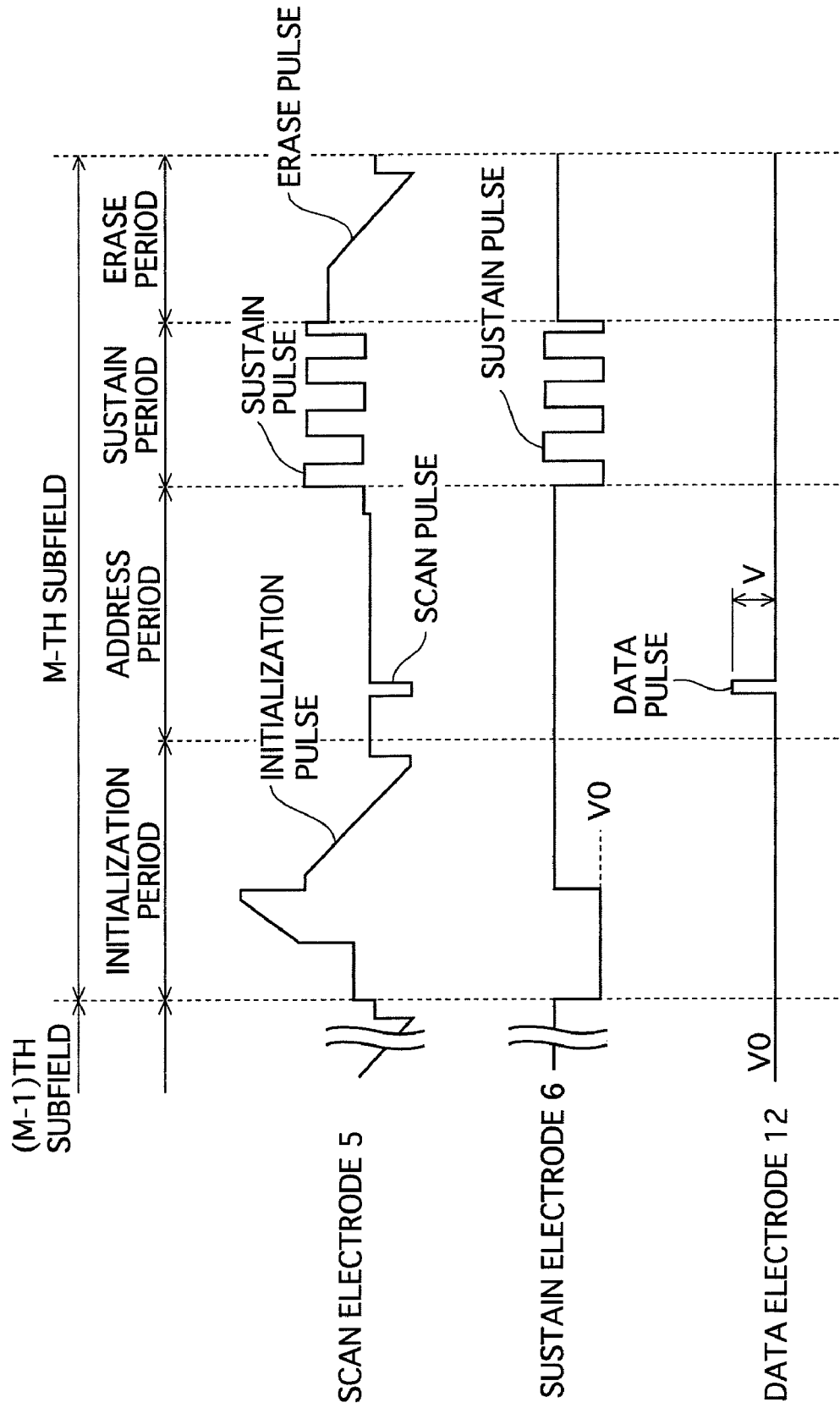
FIG. 3 shows an example waveform when the PDP is driven.

FIG. 3 shows an example of driving waveforms in the m-th subfield of one field when the PDP is driven. As shown in FIG. 3, each subfield is divided into the initialization period, the address period, the sustain period and the erase period.

The initialization period is set for erasing the wall charges in all the discharge cells (initialization discharge) so as not to be influenced by the discharge generated prior to the m-th subfield (influence of the accumulated wall charges). In the example of the driving waveforms in FIG. 3, a higher voltage (initialization pulse) is applied to the scan electrode 5 than the data electrode 11 and the sustain electrode 4 to cause the gas in the discharge cell to discharge. As a result, electric charges generated by the discharge are accumulated on the wall surface of the discharge cells in order to nullify the potential difference among the data electrodes 11, the scan electrodes 5 and the sustain electrodes 4. Therefore, on the surface of the surface layer 8 around the scan electrodes 5 and on the surface of the MgO powder 16, negative wall charges are accumulated as the wall charges. On the other hand, positive wall charges are accumulated on the surface of the phosphor layers 14 around the data electrodes 11 and the surfaces of the surface layer 8 and the MgO powder 16 around the sustain electrodes 4. These wall charges cause a given value of wall potential between the scan 5 and data 11 electrodes as well as between the scan 5 and sustain 4 electrodes.

The address period (write period) is for addressing the discharge cells that are selected according to image signals divided into subfields (specifying the discharge cells to light or not). In this period, a lower voltage (scan pulse) is applied to the scan electrodes 5 than to the data electrodes 11 or the sustain electrodes 4 in order to light the intended discharge cells. More specifically, a voltage is applied between the scan 5 and data 11 electrodes in the same polar direction as the wall potential, as well as between the scan 5 and sustain 4 electrodes in the same polar direction as the wall potential, and thus, the address discharge is generated. As a result, negative charges are accumulated on the surface of the phosphor layers 14, on the surface of the surface layer 8 around the sustain electrodes 4, and on the surface of the MgO powder 16. In addition, positive charges are accumulated as the wall charges on the surface of the surface layer 8 around the scan electrodes 5 and on the surface of the MgO powder 16. Thus, a given value of the wall potential between the sustain 4 and scan 5 electrodes is generated.

The sustain period is set to sustain the discharge by extending the lighting period of each discharge cell specified by the address discharge so as to keep luminance according to a gradation level. In this period, in the discharge cells that have the wall charges, a sustain discharge voltage pulse (e.g. a rectangular waveform pulse of approximately 200 V) is applied between a pair of the scan electrode 5 and the sustain electrode 4 in such a manner that the voltage pulse between the pair of the scan electrode 5 and the sustain electrode 4 is out of phase with each other. Thus, the AC voltage is applied between the display electrode pairs so that a sustain pulse discharge is generated in the addressed discharge cells every time when the polarities reverse at the electrodes.

Due to the sustain discharge, in the discharge space, resonance lines having wavelengths of 147 nm are emitted from the excited Xe atoms, and molecular lines of 173 nm are emitted from the excited Xe molecules. Thus, these resonance lines and molecular lines are radiated to the surface of the phosphor layers 14, and converted into visible light. Thus, the image is displayed on the screen. The ON-OFF combinations of the subfields of red, green and blue colors enable an image to be displayed in multiple colors and gradations. Note that in the discharge cells in which the wall charges are not accumulated on the surface layer 8, the sustain discharge is not generated, and the discharge cells display black images.

In the erase period, an erase pulse of a declining waveform is applied to the scan electrodes 5. Thus, a discharge is generated in order to erase the wall charges.

(Structure of Protective Layer 17)

Figure 4A:
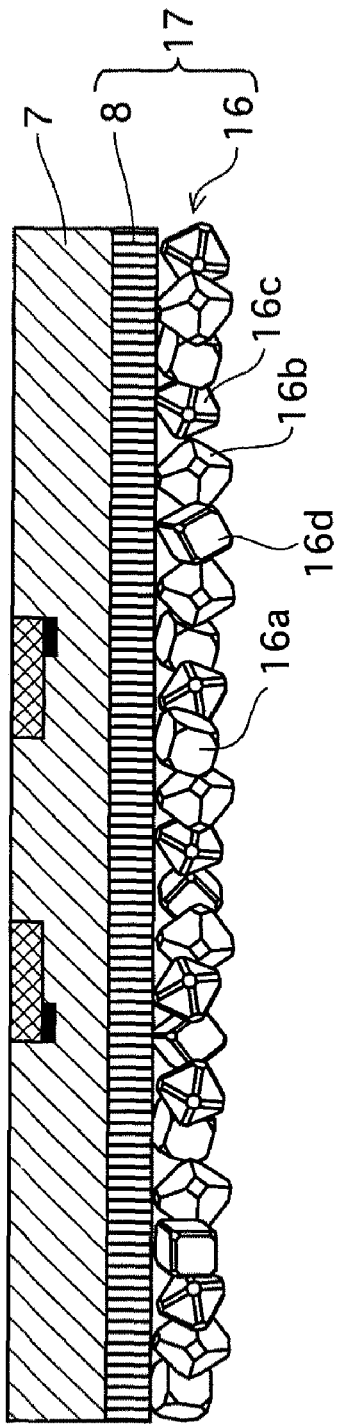
FIGS. 4A and 4B are schematic enlarged views showing the structure of a protective layer in accordance with each embodiment of the present invention.

FIG. 4A is a schematic view showing the protective layer 17 of the PDP 1 and its nearby portion (the display electrode pair 6 is omitted), and is also an enlarged view of the nearby portion of the surface layer 8 and the MgO powder 16 of FIG. 1. The protective layer 17 is made up of the surface layer 8 and crystals of the MgO particles of the MgO powder 16 disposed thereon.

The surface layer 8 is an MgO thin film with a thickness of approximately 1 µm formed on the dielectric layer 7 using the heretofore-known thin-film processing method such as the vacuum deposition method or the ion plating method. Note that the surface layer 8 does not need to be made solely of MgO but may be made of metal oxide materials that include at least one of MgO, CaO, BaO, and SrO.

FIG. 5 is a schematic view showing the shape of each Mgo particle included in the MgO powder 16. Particles of the MgO powder 16 are roughly classified into four types that are 16a, 16b, 16c and 16d according to their shapes.

The MgO particles 16a and 16b respectively shown in FIGS. 5A and 5B each have the NaCl type crystal structure with the two specific crystal faces. The particles 16c and 16d respectively shown in FIGS. 5C and 5D each have the three specific crystal faces. The shape of each particle 16a, 16b, 16c, and 16d shown in FIG. 5 is merely an example, and in reality, some distortion of the shape can be observed. FIGS. 8A-8D are electron micrographs of the shape of each MgO particle 16a, 16b, 16c, and an MgO particle formed by the gas-phase method.

The basic crystal structure of the MgO particle 16a shown in FIG. 5A is hexahedral. Since the vertexes of the hexahedral structure are truncated, the MgO particle 16a is tetrakaidecahedral (having fourteen surfaces) with truncated surfaces 82a. Each main surface 81a which is in an octagonal shape is the (100) crystal face. Each truncated surface 82a which is in a triangular shape is the (111) crystal face. The MgO particle 16a has six main surfaces 81a and eight truncated surfaces 82a.

In addition, the basic crystal structure of the MgO particle 16b shown in FIG. 5B is octahedral. Since the vertexes of the octahedral structure are truncated, the MgO particle 16b is tetrakaidecahedral with truncated surfaces 81b. Each main surface 82b in a hexagon shape is the (111) crystal face. Each truncated surface 81b in a quadrangular shape is the (100) crystal face. The MgO particle 16b has eight main surfaces 82b and six truncated surfaces 81b.

In this embodiment, the main surface is, out of the six surfaces or the eight surfaces, a surface that constitutes the largest surface area with the same Miller index. The truncated surface is a surface that is formed by truncating the vertexes of the polyhedral crystal structure.

In this embodiment, as shown in FIG. 5, a ratio of the (100) crystal face to the total surface area of the MgO particle 16a ranges between 50%-98%, inclusive, where as that of the MgO particle 16b ranges between 30%-50%, inclusive.

The MgO particle 16c shown in FIG. 5C is hexaicosahedral (having twenty-six surfaces). The MgO particle 16c has a basically identical crystal structure with that of the MgO particle 16b except for the following. Each border area between the adjacent truncated surfaces 81c is truncated, and thus an oblique surface 83c is formed on the border area. Hence, the MgO particle 16c is a hexaicosahedron having six hexagonal truncated surfaces 81c each of which is the (100) crystal face, eight octahedral main surfaces 82c each of which is the (111) crystal face, and twelve quadrilateral oblique surfaces 83c each of which is the (110) crystal face.

The MgO particle 16d shown in FIG. 5D is hexaicosahedral. The MgO particle 16d has a basically identical crystal structure with that of the MgO particle 16a except for the following. Each border area between the adjacent main surfaces 81d is truncated, and the truncated area is called an oblique surface 83d. Hence, the MgO particle 16d is a hexaicosahedron having six octahedral main surfaces 81d each of which is the (100) crystal face, eight hexagonal truncated surfaces 82d each of which is the (111) crystal face, and twelve quadrangular oblique surfaces 83d each of which is the (110) crystal face. Note that the surface area of the (100) or (110) crystal face can increase according to a burning condition, and that in such a case, the (100) or (110) crystal face is the main surface.

Each oblique surface 83 in this embodiment is a surface that is formed by truncating each side of the main surfaces 82c or 81d that connects two of the truncated surfaces 81c or 82d.

FIGS. 6A, 6B, 6C, 6D, 6E and 6F are views showing variations of the shape of each magnesium oxide particle 16a-16d.

Figure 6A:
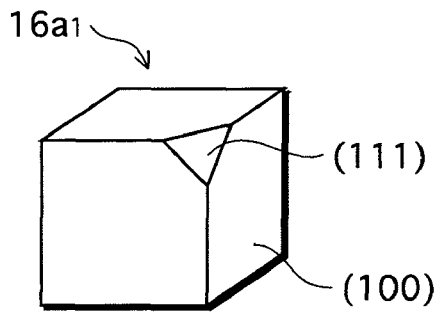
FIGS. 6A, 6B, 6C, 6D, 6E and 6F are views showing variations of the shape of each magnesium oxide particle.
Figure 6B:
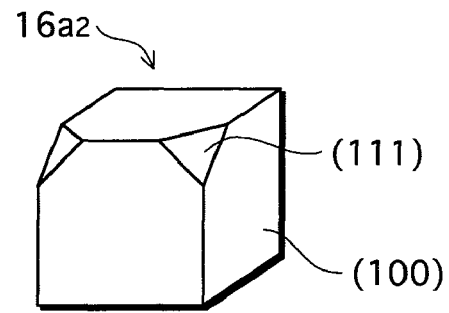
Figure 6C:
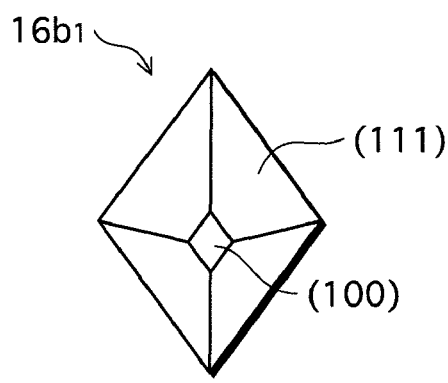
Figure 6D:
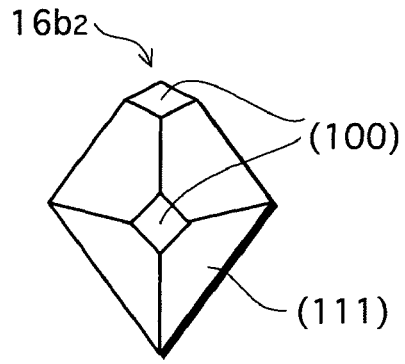

The MgO particle 16a may have any hexahedral crystal structure with at least one truncated surface. Examples of such an MgO particles include an MgO particle 16a1 having one truncated surface as shown in FIG. 6A, and an MgO particle 16a2 having two truncated surfaces as shown in FIG. 6B. Herein, the truncated surface is the (111) crystal face, and the main surface is the (100) crystal face. Note that the hexahedral crystal structure with at least one truncated surface means a polyhedral structure having at least seven surfaces and that at least one of the surfaces is the truncated surface. The MgO particle 16b may have any octahedral crystal structure with at least one truncated surface. Examples of such an MgO particle include an MgO particle 16b1 having one truncated surface as shown in FIG. 6C, and the MgO particle 16b2 having two truncated surfaces as shown in FIG. 6D. Herein, the truncated surface is the (100) crystal face, and the main surface is the (111) crystal face. Note that the octahedral crystal structure with at least one truncated surface means that a polyhedral structure has at least nine surfaces and that at least one of the surfaces is the truncated surface.

Figure 6E:
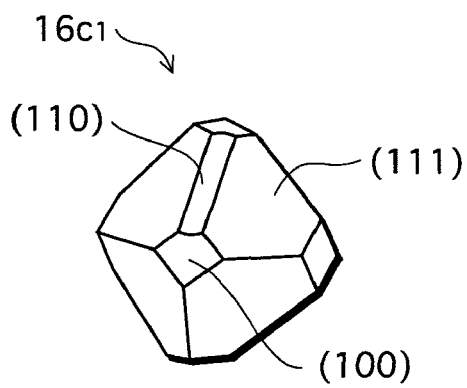

The MgO particle 16c may have any octahedral crystal structure with at least one truncated surface and one oblique surface. Examples of such an MgO particle include an MgO particle 16c1 having six truncated surfaces and one oblique surface as shown in FIG. 6E. Herein, the main surface is the (111) crystal face, the truncated surface is the (100) crystal face, and the oblique surface is the (110) crystal face. Note that the octahedral crystal structure with at least one truncated surface and one oblique surface means that a polyhedral structure has at least ten surfaces and that at least one of the surfaces is the truncated surface and that at least another one is the oblique surface.

Figure 6F:
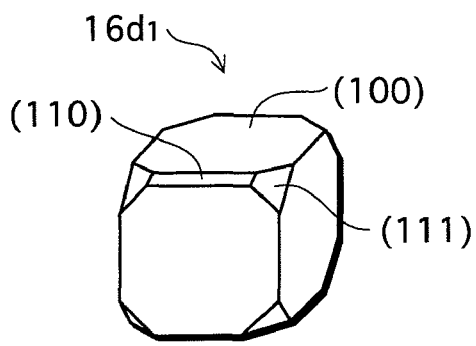

The MgO particle 16d may have any hexahedral crystal structure with at least one truncated surface and one oblique surface. Examples of such an MgO particle include an MgO particle 16d1 having eight truncated surfaces and one oblique surface as shown in FIG. 6F. Herein, the main surface is the (100) crystal face, the truncated surface is the (111) crystal face, and the oblique surface is the (110) crystal face. Note that the hexahedral crystal structure with at least one truncated surface and one oblique surface means a polyhedral structure has at least eight surfaces and that at least one of the surfaces is the truncated surface and that at least another one is the oblique surface.

In the case where the MgO powder 16 including the MgO particles 16a and 16b are disposed on the dielectric layer 7, the two specific crystal faces are exposed to the discharge space 15. Thus, such an arrangement produces synergistic effects on the properties of the two specific crystal faces. When the MgO powder 16 further includes the MgO particles 16c and 16d, the three specific crystal faces are exposed to the discharge space 15.

The MgO crystal with the NaCl type crystal structure of a cubic lattice has the (111), (110) and (100) crystal faces as its main crystal faces. Among the three, the (100) crystal face is the densest surface (surface in which atoms are the most densely packed) with the lowest surface free energy. Accordingly, the MgO crystal having the (100) crystal face is chemically stable, barely absorbing impurity gases (water, hydrocarbon, carbon dioxide, and etc.) over the wide temperature range from a low temperature to a temperature equal to or higher than a normal temperature. That is, the MgO crystal does not have to suffer from unnecessary chemical reactions that may be caused by the impurity gases. Thus, it is expected that the MgO crystal with the (100) crystal face is chemically stable even at a temperature lower than a normal temperature at which a conventional MgO crystal suffers from the impurity gas absorption (See Hyomen Gijutsu (Journal of the Surface Finishing Society of Japan) Vol. 41, No. 4, 1900, P. 50). When the MgO crystal with the (100) crystal face is used for the PDP, the absorption of the impurity gases (especially a carbon dioxide gas) inside the discharge space 15 can be suppressed over the wide temperature range, and therefore the discharge delay as a result of temperatures can be avoided. (See Journal of Chemical Physics Vol. 103, No. 8, 3240-3252, 1995). However, the (100) crystal face suffers from a small amount of secondary electron emission over the wide temperature range from a low temperature and a temperature equal to or higher than a normal temperature. Accordingly, the (100) crystal face alone is not sufficient to prevent the discharge delay. Especially when the address discharge period is reduced as a result of the development of the high-definition PDP, this problem of the discharge delay occurs more evidently.

The (111) crystal face is a surface that smoothly emits secondary electrons at a normal temperature or higher, which can prevent the discharge delay in such a temperature range. However, the (111) crystal face has the highest surface free energy of the three, and therefore the (111) crystal face is disadvantageous that the impurity gases (especially a carbon dioxide gas) are easily absorbed. The impurity gases are likely to be accumulated on the crystal face especially at a temperature lower than a normal temperature, which obstructs the electron emission. Accordingly, the (111) crystal face alone is not sufficient to prevent the discharge delay caused by temperatures (especially discharge delay in the low temperature range).

For the above reasons, the MgO powder 16 in the embodiments of the present invention is composed of the MgO particles 16a and 16b each having the NaCl type crystal structure with the two specific crystal faces (100) and (111) and the MgO particles 16c and 16d each having the NaCl type crystal structure with the three specific crystal faces (100), (110) and (111).

Accordingly, the MgO powder 16 including the MgO particles 16a-16d each having the two or three specific crystal faces exposed to the discharge space 15 suppresses the impurity gas absorption and maintains the stable electron emission in the wide temperature range from a low temperature (when the PDP is initially driven and the PDP is used in an area where an environmental temperature is low) to a temperature equal to or higher than a normal temperature (when a given length of time has passed since the initial driving of the PDP and the PDP is used at a high environmental temperature) as well as effectively suppressing the "discharge delay" and "dependence of discharge delay on temperatures." Consequently, the PDP 1 can stably display excellent images.

Note that the crystal faces may not have the above properties when the particle is small in size or a ratio of each crystal face to the total surface area of the particle is small. As described later, MgO particles formed by the gas-phase method have various diameters, and an MgO particle with a diameter of below 300 nm causes problems associated with the discharge delay dependence on temperatures even though the particle has the (100) crystal face. However, the MgO particles formed by burning the precursor each have a uniform diameter, and almost all the particles have a diameter of 300 nm and over. Thus, the MgO particles formed by burning the precursor achieve the discharge properties of each crystal face.

When the MgO particle 16c having the NaCl type crystal structure with the three specific crystal faces (100), (110) and (111) is employed in the PDP 1, the PDP 1 demonstrates the same properties as that with the MgO particles 16a and 16b. In addition, the MgO particle 16c enables a sufficient amount of secondary electrons to be emitted without the aid of space charges generated at the start of discharge in the initial stage of driving the PDP 1. More specifically, since the (110) crystal face emits secondary electrons over the wide temperature range from low to high temperatures, the MgO particles 16c and 16d with the three specific crystal faces can emit more secondary electrons than the MgO particles 16a and 16b with the two specific crystal faces.

For the reasons mentioned above, using the MgO particles 16c and 16d is advantageous that the stable secondary electron emission is ensured regardless of the number of pulses (the number of sustain pulses) applied to the display electrode pairs 6 during the sustain period. (In other words, the advantage that the discharge delay dependence on space charges can be reduced.) Thus, the MgO particles 16c and 16d can suppress the "dependence of discharge delay on space charges" as well as "discharge delay" and "dependence of discharge delay on temperatures." Consequently, the PDP 1 is expected to display even better images.

Figure 9:
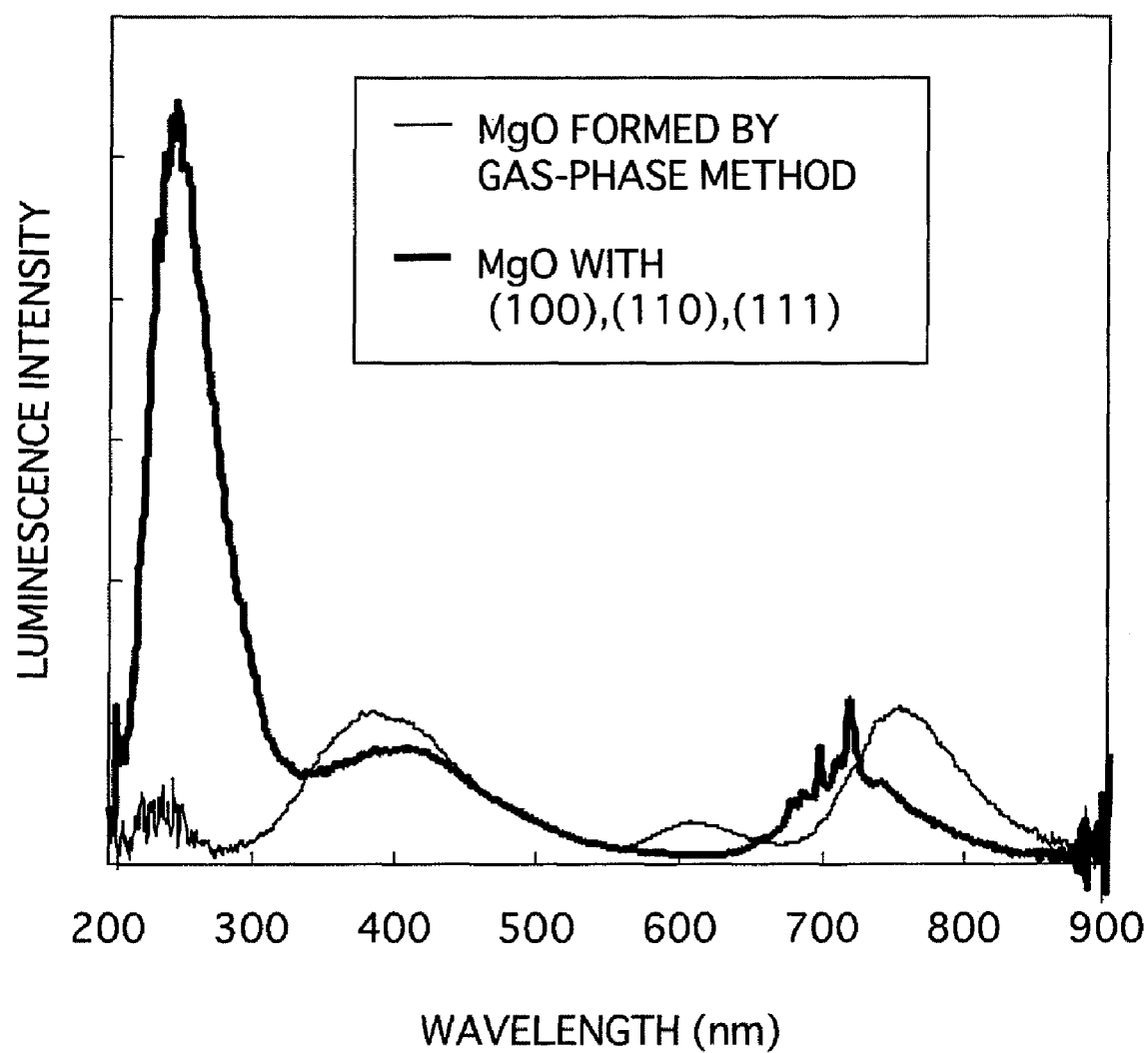
FIG. 9 is a graph showing waveforms obtained by observing the magnesium oxide particles by Cathodoluminescence measurement.

FIG. 9 shows the measurement results of the conventional MgO crystal formed by the gas-phase method and the MgO particles 16c and 16d with the three specific crystal faces measured by Cathodoluminescence (CL) measurement.

As shown in FIG. 9, when the spectra of the MgO crystal formed by the gas-phase method were measured, the spectra with wavelengths of approximately 200-300 nm were hardly detected. On the other hand, when the spectra of the MgO particles 16c and 16d were measured, the luminescence intensity peaks at approximately 200-300 nm. The light with the same wavelengths are also emitted during discharge of a PDP. Since the energy of the light with wavelength of about 200 nm-300 nm is approximately 5 eV, the light can excite the electrons of the MgO particles whose energy level in the band structure is up to 5 eV below the vacuum level. As a result, the secondary electrons are easily emitted to the discharge space.

As the light with wavelengths of approximately 200-300 nm are emitted during the discharge, the space charges alone can sufficiently promote secondary electron emission without any other special assistance. In a PDP that includes a protective layer having the MgO crystals formed by the gas-phase method dispersed thereon, the discharge delay is changed by the number of discharge pulses. However, with the light, the discharge delay does not need to depend on the space charges since the special assistance is unnecessary. Accordingly, such a discharge delay change does not occur.

As described above, when the PDP has the MgO particles 16c and 16d with the three specific crystal faces that emit deep ultra violet (DUV) rays detectable by CL measurement, due to the M90 particles 16c and 16d, the PDP emits light with wavelengths of approximately 200-300 nm during the discharge. Accordingly, using the MgO particles 16c and 16d realizes the PDP that is not influenced by the space charges.

Subsequently, the surface ratios of the crystal faces in the crystal structure of each MgO particle 16a, 16b, 16c and 16d in accordance with this embodiment are described as follows.

According to the investigation by the inventors, the following surface ratios are desirable so as to effectively achieve the above effects.

The surface ratio of the (100) crystal face to the total surface area of the MgO particle 16a favorably falls within a range between 50%-98%, inclusive.

The surface ratio of the (100) crystal face to the total surface area of the MgO particle 16b favorably falls within a range between 30%-50%, inclusive.

The surface ratio of the (111) crystal face to the total surface area of the MgO particle 16c favorably falls within a range between 10%-80%, inclusive.

The surface ratio of the (100) crystal face to the total surface area of the MgO particle 16c favorably falls within a range between 5%-50%, inclusive.

The surface ratio of the (110) crystal face to the total surface area of the MgO particle 16c favorably falls within a range between 5%-50%, inclusive.

The surface ratio of the (111) crystal face to the total surface area of the MgO particle 16d favorably falls within a range between 10%-40%, inclusive.

The surface ratio of the (100) crystal face to the total surface area of the MgO particle 16d favorably falls within a range between 40%-80%, inclusive.

The surface ratio of the (110) crystal face to the total surface area of the MgO particle 16d favorably falls within a range between 10%-40%, inclusive. To fix the MgO powder 16 to the surface layer 8, note that some of the MgO particles 16a-16d may be partially embedded in the surface layer 8 in addition to the arrangement that the MgO powder 16 is dispersed on the surface layer 8 as shown in FIG. 4A. Such an arrangement of the MgO powder 16 enables the MgO particles 16a-16d to be more firmly fixed to the surface layer 8. Thus, when the PDP 1 is shaken or shocked, thanks to the arrangement, the MgO powder 16 does not easily come off from the surface layer 8, as is expected. Thus, this arrangement is favorable.

Although FIGS. 1 and 4 each show the structure of the protective layer 17 having the MgO powder 16 disposed over the entire surface of the surface layer 8, the present invention is not limited to the above structure. More specifically, in Embodiment 1, the surface layer 8 covers the entire surface of the dielectric layer 7 so as to protect the dielectric layer 7. In view of the protection, the MgO powder 16 may be disposed on a partial surface area of the surface layer 8. For example, the MgO particles can be disposed on a partial surface area above the transparent electrodes 41 and 51, and alternatively can be disposed on a partial surface area above the discharge space 15 (i.e. an area that does not correspond to the barrier ribs 13). Furthermore, the density of the MgO particles 16a-16d may be variable in a given range. All of the above variations are expected to have the similar effects to that of the PDP 1 of Embodiment 1.

Embodiment 2

Figure 4B:
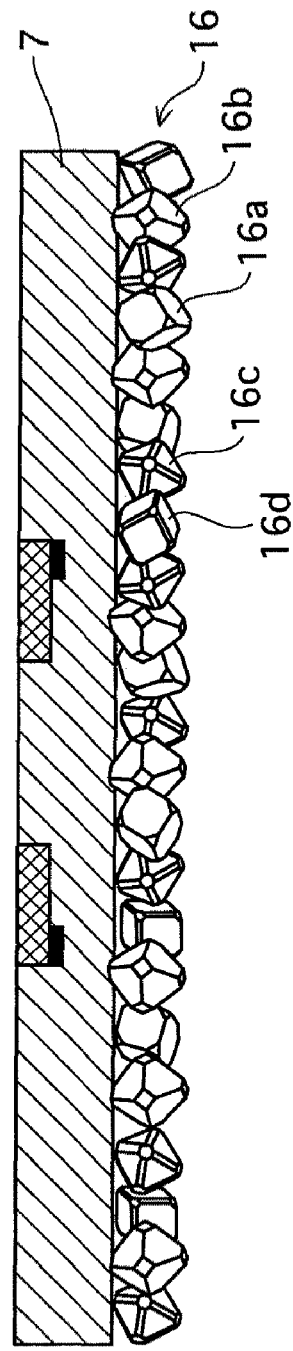
Figure 7:
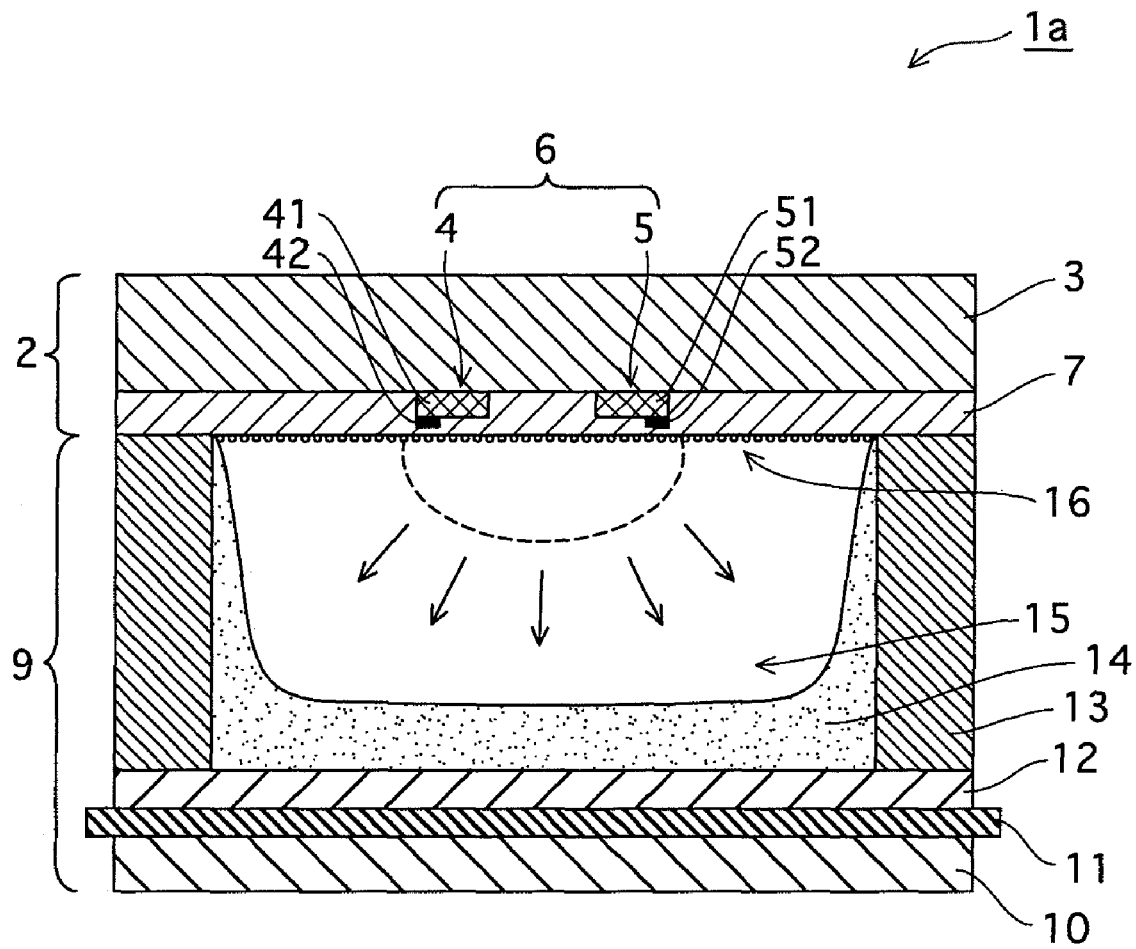
FIG. 7 is a cross-sectional view showing the structure of a PDP in accordance with Embodiment 2 of the present invention.

Following is a description of a PDP 1a in accordance with Embodiment 2 of the present invention. The differences between the PDP 1 and the PDP 1a are mainly described. FIG. 7 is a cross-sectional view of the PDP 1a. FIG. 4B is a schematic view showing the protective layer of the PDP 1a and its nearby portion.

The feature of the PDP 1a is that the protective layer is composed of the MgO powder 16 disposed directly on the dielectric layer 7 does not include the surface layer 8. The MgO powder 16 includes the MgO particles 16a-16d as with Embodiment 1.

The PDP 1a with the above feature promotes the smooth secondary electron emission in the wide temperature range from low to a normal temperature or higher when the PDP 1a is initially driven. Thus, the PDP 1a can display excellent images by effectively suppressing the "discharge delay" and "dependence of discharge delay on temperatures." In addition, the MgO particle 16c included in the MgO powder 16 can improve the dependence of discharge delay on space charges. Thus, the PDP 1a is expected to display images even more stably.

Furthermore, since the PDP 1a is not provided with the surface layer 8, the process to form the surface layer 8 (thin-film processing such as the sputtering method, ion plating method, and electron-beam deposition method) is completely unnecessary. That is, due to the omission of the process, the production cost can be reduced, which ensures the effectiveness and great advantage to the PDP 1a.

Note that, in the PDP 1a, it is the MgO powder 16 that protects the dielectric layer 7. From the standpoint of the protection, the MgO powder 16 needs to be disposed over the entire surface of the dielectric layer 7.

<Production Method of PDP>

Following is a description of the production method of the PDP 1 and the PDP 1a in accordance with each embodiment of the present invention. The difference between the PDP 1 and 1a is simply the structure of the protective layer. The production processes of the PDP 1 and 1a are basically identical with each other.

(Manufacturing Back Panel)

On the surface of the back panel glass 10 made up of soda-lime glass with a thickness of approximately 2.6 mm, conductive materials mainly composed of Ag are applied with the screen printing method in a stripe pattern at a given interval. Thus, the data electrodes 11 with a thickness of some micrometers (e.g. approximately 5 μm) are formed. The data electrodes 11 are made up of a metal such as Ag, Al, Ni, Pt, Cr, Cu, and Pd or a conductive ceramic such as metal carbide and metal nitride. The data electrodes 11 may be made of the composition of these materials, or may have a layered structure of these materials as necessary.

The gap between each two adjacent data electrodes 11 is set to 0.4 mm or below so that the PDP 1 has a 40-inch-screen in conformity with the NTSC or VGA specification.

Following that, a glass paste with a thickness of approximately 20-30 μl made of lead-based or lead-free low-melting glass or SiO₂ material is applied and burned over the back panel glass 10 and the data electrodes 11 in order to form the dielectric layer 12.

Subsequently, the barrier ribs 13 are formed on the dielectric layer 12 as follows. The low-melting glass paste is applied and burned on the dielectric layer 12. The paste is formed, using a sandblast method or a photolithography method, in a grid pattern dividing the borders of a plurality of adjacent discharge cells (unshown) arranged in rows and columns.

After forming the barrier ribs 13, on the lateral surface of each barrier rib 13 and on the exposed surface of the dielectric layer 12, phosphor ink including one of red (R), green (G) and blue (B) phosphors commonly used for the AC PDP is applied. The phosphor ink is then dried and burned to form the phosphor layers 14.

Following is an example of the chemical composition of the applicable phosphors of the red, green and blue colors.

Red phosphor; (Y, Gd) BO₃: Eu,
Green phosphor; Zn₂SiO₄: Mn,
Blue phosphor; BaMgAl₁₀O₁₇: Eu It is desirable that each phosphor (powder) has a particle diameter of 2.0 μm on average. Into a server, 50 mass percent of the phosphors are put, and 1.0 mass percent of ethycellulose and 49 mass percent of solvent (α-terpineol) are added. The phosphors, the ethycellulose and the solvent are stirred and mixed by a sand mill so as to manufacture the phosphor ink whose viscosity is $15 \times 10^{-3}$ Pa·s. When this phosphor ink is jetted into the gaps between the barrier ribs 13 from a nozzle with a diameter of 60 μm, the panel is moved in the longitudinal direction of the barrier ribs 13. Accordingly, the ink is applied in a stripe pattern on the panel. Then, the ink is burned for 10 minutes at 500° C. Thus, the phosphor layers 14 are formed.

Hence, the manufacturing of the back panel 9 is completed.

(Manufacturing Front Panel 2)

On the surface of the front panel glass 3 made of soda-lime glass with a thickness of approximately 2.6 mm, the display electrode pairs 6 are formed. Embodiment 2 adopts the printing method as an example to form the display electrode pairs 6. However, the display electrode pairs 6 may be formed by a dye coat method, blade coat method or the like.

To begin with, on the front panel glass 3, transparent electrode materials such as ITO, SnO₂, and ZnO are applied in a given pattern such as a stripe pattern and dried. Thus, transparent electrodes 41 and 51 with thicknesses of approximately 100 nm are formed.

Meanwhile, a photosensitive paste is prepared by blending Ag powder and an organic vehicle with a photosensitive resin (photodegradable resin). The photosensitive paste is applied on the transparent electrodes 41 and 51, and the transparent electrode 41 and 51 are covered with a mask having an opening that matches the pattern of the bus lines. After a development process in which exposure is performed on the mask, the photosensitive paste is burned at a burning temperature of approximately 590-600° C. Thus, the bus lines 42 and 52 with a final thickness of some micrometers are formed on the transparent electrodes 41 and 51. Though the screen method can conventionally produce a bus line with a width of 100 μm at best, this photomask method enables the bus lines 42 and 52 to be formed as thin as 30 μm. Besides Ag, the bus lines 42 and 52 can be made of other metal materials such as Pt, Au, Al, Ni, Cr, tin oxide and indium oxide. Other than the above methods, the bus lines 42 and 52 can be formed by etching a film having been formed by the deposition method or the sputtering method.

Subsequently, a paste is prepared by mixing (i) lead-based or lead-free low-melting glass or SiO₂ powder whose softening point is 550° C.-600° C. with (ii) organic binder such as butyl carbitol acetate. The paste is applied on the display electrode pairs 6, and burned at a temperature ranging from 550° C. to 650° C. Thus, the dielectric layer 7 with a final thickness of some micrometers to some tens of micrometers is formed.

(Forming Method of MgO Particles Having Crystal Structure with Two Specific Crystal Faces or Three Specific Crystal Faces)

In order to form the crystalline body of the MgO powder 16, each MgO particle 16a-16d is formed. As an example of the forming method, high-purity magnesium oxide compound (MgO precursor) is equally treated with heat (burned) in oxygen-containing atmosphere at a high temperature (700° C. or higher).

In the embodiments of the present invention, the magnesium compound for the MgO precursor may be at least one of (may be a mixture of two or more) magnesium hydroxide, magnesium alkoxide, acetylacetone magnesium, magnesium nitrate, magnesium chloride, magnesium carbonate, magnesium sulfate, magnesium oxalate, and magnesium acetate. Some of the compounds listed above are present generally in hydrated form. Such magnesium hydrate is also applicable.

The purity of the magnesium compound for the MgO precursor is favorably 99.95% or more, and more favorably 99.98% or more because of the following reason. When many impurity elements such as alkali metals, boron, silicon, iron and aluminum are contained in the magnesium compound, there is a risk that the particles of the compound fuse and sinter together during the heat treatment (especially at a high burning temperature), and therefore the high-crystalline MgO particles are unlikely to grow. On the other hand, the high-purity magnesium compound prevents such a problem.

When such a high-purity magnesium oxide precursor is burned in oxygen-containing atmosphere, the MgO particles 16a-16d can be formed as highly pure as 99.95% or more, or as 99.98% or more.

A burning temperature of the magnesium oxide precursor is favorably 700° C. or more, and more favorably 1000° C. or more. This is because the crystal faces do not grow properly, having crystal defects, at a burning temperature lower than 700° C., and therefore the particles absorb much impurity gas. Note that when the burning temperature reaches 2000° C. or higher, the oxygen escapes from the particles, which results in the crystal defects causing the absorption of much impurity gas. Thus, the favorable burning temperature is 1800° C. or below.

The MgO precursor burned at a temperature ranging from 700° C. to 2000° C., inclusive, turns to the MgO particles 16a-16d with the two or three specific crystal faces. According to another experiment carried out by the inventors, it was observed that the (110) crystal face tends to shrink when the precursor is burned at a temperature of approximately 1500° C. or higher. Thus, in order to enhance the yield of the MgO particles 16c and 16d having the three specific crystal faces, the burning temperature desirably ranges from 700° C. to no higher than 1500° C. On the other hand, in order to enhance the yield of the MgO particles 16a and 16b, the burning temperature desirably falls in a range of 1500° C.-2000° C., inclusive.

Note that the MgO particles 16a-16d may be screened through a screening process. The following is a concrete description of a process for forming magnesium hydroxide that is a magnesium oxide precursor with use of liquid phase methods. The description also shows a process for forming the MgO powder including the MgO particles 16a-16d from the magnesium hydroxide.

(1) As a starting material, liquid-phase magnesium alkoxide ($Mg(OR)_2$) or liquid-phase acetylacetone magnesium at a purity greater than or equal to 99.95% is prepared. The solution of magnesium alkoxide ($Mg(OR)_2$) or acetylacetone magnesium is hydrolyzed with a small amount of acid, and therefore magnesium hydroxide gel that is the MgO precursor is obtained. Subsequently, the gel is burned in an atmosphere at a temperature ranging from 700° C. to 2000° C., inclusive, for dehydration. Thus, the powder having the MgO particles 16a-16d is formed.

(2) As a starting material, liquid-phase magnesium nitrate ($Mg(NO_3)_2$) at a purity greater than 99.95% is prepared. An alkali solution is added to the solution of magnesiumnitrate ($Mg(NO_3)_2$), and thus a magnesium hydroxide precipitation is obtained. The magnesium hydroxide precipitation is separated from the solution, and then is burned in an atmosphere at a temperature ranging from 700° C. to 2000° C., inclusive, for dehydration. Consequently, the precipitation forms into the powder having the MgO particles 16a-16d.

(3) As a starting material, liquid-phase magnesium chloride ($MgCl_2$) at a purity greater than or equal to 99.95% is prepared. Calcium hydroxide ($Ca(OH)_2$) is added to the solution of magnesium chloride ($MgCl_2$), and thus, a magnesium hydroxide ($Mg(OH)_2$) precipitation that is the magnesium oxide precursor is obtained. Subsequently, the magnesium hydroxide precipitation is separated from the solution, and then is burned in an atmosphere at a temperature ranging from 700° C. to 2000° C., inclusive, for dehydration. Thus, the precipitation forms into the powder having the MgO particles 16a-16d.

With use of the liquid phase methods (1)-(3) in which the solution of magnesium alkoxide ($Mg(OR)_2$), magnesium nitrate ($Mg(NO_3)_2$), or magnesium chloride ($MgCl_2$) each of which is at a purity greater than or equal to 99.95% is hydrolyzed with the acids or alkalis whose concentrations are controlled, the magnesium hydroxide ($Mg(OH)_2$) precipitation having extremely fine crystal grains can be achieved. Burning the precipitation in the atmosphere at 700° C. or higher separates $H_2O$ (water) from ($Mg(OH)_2$), and thus the MgO powder is formed. The MgO powder formed as above has few crystal defects, and accordingly scarcely absorbs a hydrocarbonic gas.

Generally, the MgO particles formed by a conventional gas-phase oxidation method comparatively exhibit more variations in diameter. Because of this, in a conventional forming process, the screening process is necessary to select particles with a roughly uniform diameter so that the particles have uniform discharge properties. (Disclosed in Japanese Laid-Open Patent Application Publication No. 2006-147417)

In accordance with the embodiments of the present invention, on the other hand, although the MgO particles are also obtained by burning the MgO precursor, compared with those formed by the conventional method, the MgO particles each have a uniform diameter within a given size range. More specifically, the size of the MgO particles in accordance with the embodiments falls within a range of 300 nm-2 μm. Each particle in the embodiments has a smaller surface area than a crystal formed by the gas-phase oxidation method, which is why the MgO particles 16a-16d do not absorb much impurity gas and thereby efficiently emitting secondary electrons. In addition, since the particles each have a uniform diameter, the screening process to screen unnecessary particles can be omitted. The simplified process brings about significant advantage to the production efficiency and the production cost.

Note that $Mg(OH)_2$, the magnesium oxide precursor, is a compound that has a hexagonal crystal structure, which is different from MgO having octahedral (having eight regular surfaces) cubic structure. Although the crystal growth process in which $Mg(OH)_2$ is pyrolyzed to form the MgO crystal is complicated, the MgO crystal keeps the hexagonal crystal structure of $Mg(OH)_2$ in the crystal growth. As a result, the (100), (111) and (110) crystal faces are formed.

On the other hand, when the MgO crystal is formed with a vapor phase synthetic method, only a particular crystal face is likely to grow. For example, direct oxidation of Mg (magnesium metal) is used for forming the MgO powder as follows. A small amount of an oxygen gas is added to the magnesium metal while the magnesium metal is heated at a high temperature in a bath filled with an inert gas. However, this method causes the crystal faces to grow only in the (100) direction because Mg absorbs the oxygen gas. Consequently, the crystal faces oriented in other directions are unlikely to grow.

The MgO particles can also be obtained by the following method similarly to the above method in which magnesium hydroxide is burned. The magnesium compound that does not have a sodium chloride type crystal structure (cubic structure) is directly burned as a magnesium oxide precursor at a temperature of 700° C. or higher to be in a thermal equilibrium state. Such a magnesium compound includes magnesium alkoxide, magnesiumnitrate, magnesium chloride, magnesium carbonate, magnesium sulfate, magnesium oxalate, and magnesium acetate. When a $(OR)_2$, $Cl_2$, $(NO_3)_2$, $CO_3$, or $C_2O_4$ group, a coordinating atom of Mg, is separated from the magnesium compound, such a mechanism works that the (110) and (111) crystal faces grow as well as the (100) crystal face. Thus, the powder of the MgO particles 16a-16d having the two or three specific crystal faces can be achieved.

(Forming Process of Protective Layer)

The protective layer according to Embodiments 1 and 2 are formed in the following process.

In order to form the protective layer 17 in accordance with Embodiment 1, the surface layer 8 made of the MgO material is formed on the dielectric layer 7 by the heretofore-known thin-film processing such as the vacuum deposition method or the ion plating method.

Subsequently, on the surface of the surface layer 8, the powder including the MgO particles 16a-16d are applied by the screen printing method or the spraying method. Subsequently, the solvent are dried and removed, and the MgO particles 16a-16d are fixed to the surface layer 8, and the protective layer 17 according to Embodiment 1 is formed.

In order to form the protective layer in accordance with Embodiment 2, on the surface of the dielectric layer 7, the powder including the MgO particles 16a-16d are applied by the screen printing method or the spraying method. The MgO particles 16a-16d are fixed to the dielectric layer, and thus the protective layer according to Embodiment 2 is formed.

The front panel 2 is completed after the protective layer has been formed in the above process.

(Completion of PDP)

The front panel 2 and the back panel 9 are sealed together with use of sealing glass. Thereafter, the interior of the discharge space 15 is highly vacuumed ($1.0 \times 10^{-4}$ Pa) thereby removing the atmosphere and impurity gas from the discharge space 15. In the discharge space 15, Xe mixed gas such as Ne—Xe-based, He—Ne—Xe-based, or Ne—Xe—Ar-based gas is enclosed as discharge gas at a given pressure (66.5 kPa-101 kPa in this embodiment). The concentration of the Xe gas in the mixed gas falls in a range of 15%-100%.

The PDP 1 or 1a is completed after having gone through the above processes.

In Embodiments 1 and 2, the front panel glass 3 and the back panel glass 10 are made of soda-lime glass. However, this is merely an example, and note that other materials may be used.

Performance Evaluation Experiment

In order to confirm the performance effect according to the embodiments of the present invention, the following Experiments 1-6 were carried out, using PDP samples in accordance with Examples (Samples 1-5) and Comparative Examples (Samples 6-10).

The structure that is common to all the samples is as follows. The scan electrodes and the sustain electrodes (display electrode pairs) are made of ITO electrodes and bus electrodes made of Ag. Each ITO electrode is 150 µm wide, and each bus electrode is 70 µm wide and 6 µm thick. The discharge gap between display electrode pairs is 75 µm long. The glass substrate is 35 µm thick. Each barrier rib is 110 µm high. The underside of each barrier rib is approximately 80 µm wide, and the top thereof is approximately 40 µm wide. Each data electrode is 100 µm wide, and 5 µm thick. Each phosphor layer is 15 µm thick.

In the forming process of the protective layer, the MgO particles with the two or three specific crystal faces are formed. With the MgO particles, the protective layer is formed. The heating condition for forming the MgO particles from the MgO precursor (heat treatment condition), the quantity of the MgO powder for applying, the Xe gas concentration in the panel and such are as shown in Table 1 listed below.

In Example 1 (Samples 1 and 2) that is in accordance with Embodiment 2, the protective layer is formed with the MgO powder 16 of which approximately 90% are composed of the (i) MgO particles 16a and 16b with the two specific crystal faces (Sample 1), and (ii) the MgO particles 16c and 16d with the three specific crystal faces (Sample 2).

In Example 2 (Samples 3-5), the protective layer is formed as follows. The MgO deposition layer is formed by the vapor deposition method (EB) or the ion plating method. Subsequently, the MgO powder 16 of which approximately 90% are composed of (i) the MgO particles 16a and 16b with the two specific crystal face or (ii) the MgO particles 16c and 16d with the three specific crystal faces are disposed on the MgO deposition layer.

In Comparative Example 6 (Sample 6), the protective layer includes solely the MgO deposition layer with the (111) crystal face formed by the vacuum deposition method.

In Comparative Example 7 (Sample 7), the protective layer has single-crystal MgO particles formed by the gas-phase method disposed thereon.

In Comparative Example 8 (Sample 8), the protective layer is formed as follows. The single-crystal MgO particles with a diameter of approximately 1 µm at the maximum formed by the gas-phase method are disposed on the MgO deposition layer formed by the vapor deposition method.

In Comparative Example 9 (Sample 9), the protective layer is formed as follows. The single-crystal MgO particles with a diameter of approximately 3 µm at the maximum formed by the gas-phase method are disposed on the MgO deposition layer formed by the vapor deposition method.

In Comparative Example 10 (Sample 10), the protective layer is formed as follows. The high-pure MgO precursor is burned at 600° C. to form the MgO particles, and the MgO particles are disposed on the MgO deposition layer formed by the vapor deposition method.

Experiment 1

Evaluation of MgO Particle's Crystal Face

With use of Samples 1, 4, 5, 7-9, a ratio of a surface area of the (100) crystal face to a surface area of the (111) crystal face of each MgO particle of the protective layer was measured. Although the area ratio can be actually measured by visual observation with an electron microscope, the crystal faces are comprehensively identified by an analysis with electron beams and the like in this experiment.

Experiment 2

Evaluation of MgO Particle with TDS (Thermal Desorption Spectroscopy)

With use of Samples 1-10, an amount of impurity gas (water, carbon dioxide gas, hydrocarbon gas) absorbed by the MgO protective layer was measured with the thermal desorption spectroscopy (TDS) technique. The measurement results are shown in Table 1.

The amount of impurity gas (water, carbon dioxide gas, hydrocarbon gas) absorbed by Sample 10 (total amount of gas desorption between 10° C.-1200° C.) is set to 1 as the standard value. Based on the standard value, relative values are estimated to show the measurement results of other samples. It is indicated that the smaller the relative values are, the better the MgO particles that absorb less impurity gas are.

Experiment 3

Evaluation of Discharge Delay

With use of the following methods, evaluations were made of a discharge delay of Samples 1-10 when a data pulse is applied. The measurement results are shown in Table 1.

After an initialization pulse shown in FIG. 3 was applied to a given pixel of each sample, data pulses and scan pulses were repeatedly applied. Each pulse width of the data pulses and the scan pulses is set to 100 µsec which is longer than that when a PDP is generally driven at 5 µsec. A time lag (discharge delay) between the pulse application and the discharge generation was measured for one hundred times when the data pulses and the scan pulses were applied. Using the maximum and minimum values of the measured time lag, an average of the discharge delay was calculated.

The discharge delay was observed with the following apparatuses. Light emission of the phosphors as a result of the discharge was received with the photosensor module (H6780-20 manufactured by Hamamatsu Photonics K.K.), and waveforms of the applied pulses and the received light signals were observed with the digital oscilloscope (DL9140, manufactured by Yokogawa Electric Cooperation).

The measurement result of the discharge delay of Sample 6 shown in Table 1 is set to 1 as the standard value. Based on the standard value, relative values are estimated to show the measurement results of other samples. It is indicated that the smaller the relative value is, the shorter the discharge delay is.

Experiment 4

Evaluation of Dependence of Discharge Delay on Temperatures

In the same way as Experiment 1, with use of a temperature-controlled bath, evaluations were made of a discharge delay of Samples 1-10 at −5° C. and 25° C. environmental temperatures. Subsequently, a ratio of the discharge delay at −5° C. to at 25° C. was calculated with use of each sample.

The measurement results are shown in Table 1. It is indicated that the closer to the value 1 the ratios of the discharge delay are, the less dependent on the temperatures the discharge delay is.

Experiment 5

Evaluation of Screen Flicker

Evaluations were made of a screen flicker using Samples 1-10 as follows. A white image was displayed on a screen, and then occurrence of the screen flicker was visually checked.

Experiment 6

Evaluation of Dependence of Discharge Delay on Space Charges

In the same way as Experiment 4, evaluations were made of a discharge delay of Samples 1-10 at the maximum and the minimum number of pulses before an address discharge. Subsequently, a ratio of the discharge delay at the maximum to that at the minimum number was calculated. The measurement results are shown in Table 1. The measurement results indicate that the closer to the value 1 the ratio of the discharge delay is, the less dependent on space charges the discharge delay is.

TABLE 1

| Sample | Structure of Protective Layer on Dielectric Layer | MgO Deposition Layer | Precursor: Starting Mat. & Manuf. Meth.; Purity | Heating Temp [° C.] | Ratio of (111) to Total Surface | Appli. Qt. of MgO [gr/cm2] |
|---|---|---|---|---|---|---|
| 1 | MgO with (100) (111) | x | $Mg(OH)_2$; Hydrolyzing $Mg(OR)_2$; 99.98[%] | 1800 | 5% | $3 \times 10^{-3}$ |
| 2 | MgO with (100) (111) (110) | x | $Mg(OH)_2$; Adding $Ca(OH)_2$ to $MgCl_2$; 99.99[%] | 1400 | — | $1 \times 10^{-5}$ |
| 3 | MgO with (100) (111) (110) | o | $Mg(OH)_2$; Adding $Ca(OH)_2$ to $MgCl_2$; 99.99[%] | 1400 | — | $1 \times 10^{-5}$ |
| 4 | MgO with (100) (111) | o | $Mg(OH)_2$; Adding $Ca(OH)_2$ to $MgCl_2$; 99.99[%] | 1600 | 8% | $3 \times 10^{-5}$ |
| 5 | MgO with (100) (111) | o | $MgCO_3$; Pyrolyzing $MgCO_3$; 99.96[%] | 1800 | 2% | $1 \times 10^{-5}$ |
| 6 | (MgO Deposited Layer) | o | — | — | — | — |
| 7 | Single Crystal MgO | x | Gas Phase Meth. | — | 0% | $3 \times 10^{-3}$ |
| 8 | Single Crystal MgO (max dia. = 1 μm) | o | Gas Phase Meth. | — | 0% | $5 \times 10^{-5}$ |
| 9 | Single Crystal MgO (max dia. = 3 μm) | o | Gas Phase Meth. | — | 0% | $5 \times 10^{-5}$ |
| 10 | MgO (formed by burning precursor) | o | $Mg(OH)_2$; Adding $Na(OH)$ to $Mg(NO_3)_2$; 99.98[%] | 600 | 25% | $5 \times 10^{-5}$ |

| Sample | Qt. of Impurity Gas Absorption *Sample 10 = 1 (Stan. Val.) | Discharge Delay (25° C.) *Sample No. 6 = 1 (Stan. Val.) | | Discharge Delay Dependence on Temp. *Ratio of at −5° C. to 25° C. | | Screen Flicker (−5° C.) | Discharge Delay Dependence on Space Charge |
|---|---|---|---|---|---|---|---|
| | | Xe 15% | Xe 100% | Xe 15% | Xe 100% | | |
| 1 | 0.012 | 0.082 | 0.078 | 1.05 | 1.21 | x | 1.6 |
| 2 | 0.02 | 0.068 | 0.066 | 1.03 | 1.08 | x | 1.15 |
| 3 | 0.02 | 0.043 | 0.035 | 0.98 | 1.01 | x | 0.96 |
| 4 | 0.015 | 0.043 | 0.04 | 1.01 | 1.03 | x | 1.11 |
| 5 | 0.012 | 0.06 | 0.051 | 1.06 | 1.1 | x | 1.85 |
| 6 | — | 1 | 1 | 2.51 | 3.13 | o | 2.99 |
| 7 | 0.7 | 0.43 | 0.55 | 1.55 | 1.81 | o | 2.66 |
| 8 | 0.7 | 0.24 | 0.33 | 1.42 | 1.55 | o | 2.53 |
| 9 | 0.1※ | 0.1 | 0.12※ | 0.99 | 1.02※ | x | 2.01 |
| 10 | 1 | 0.087 | 0.13 | 1.76 | 1.9 | o | 2.92 |

*Samples 1-5 based on Examples, Sample 6-10 based on Comparative Examples
※Extrapolated Value

Consideration

The measurement results in Table 1 shows that, regardless of the existence of the MgO deposition layer, each Sample 1-5 is dramatically advantageous regarding discharge delay dependence on the temperatures or space charges compared with Samples 6-10. Furthermore, Samples 1-5 show that the structure with the MgO deposition layer has superiority in the discharge delay over the structure without the MgO deposition layer.

In each Sample 1-5, no screen flicker is observed, and significant reduction of the absorption amount of the impurity gas is observed.

These experiment results show that the excellent image display performance is achieved because the MgO particles with the two or three specific crystal faces have greatly improved the protective layer properties. More specifically, the reason the impurity gas absorption is reduced in Samples 1-5 is that the MgO particles in the protective layer has the (100) crystal face that does not absorb much impurity gas in the low temperature region and the (111) crystal face that smoothly emits secondary electrons at a normal temperature or higher.

When a comparison is made between Sample 2 and Sample 1, and between Sample 3 and Samples 4-5, Samples 2 and 3 each show a particular reduction in the dependence on the space charges. This is because the MgO particles have the (110) crystal face that emits secondary electrons in the wide temperature range from low to high temperatures.

Note that, in Samples 1-5, the MgO particles used for the protective layer are formed by burning a high-pure magnesium precursor at a heating temperature higher than 700° C. (1400° C.-1800° C.) Using such a method, larger MgO particles with fewer crystal defects can be obtained in Examples than in Comparative Examples. Adopting the MgO particles with such an excellent structure, Samples 1-5 achieve the above properties.

On the other hand, Sample 6 of Comparative Example shows a longer discharge delay and larger dependence of the discharge delay on the temperatures than Samples 1-5. This is because Sample 6 is not constituted from the MgO particles with the two or three specific crystal faces in accordance with the embodiments but solely from the MgO deposition layer with the (111) crystal face formed by the vacuum deposition method. Hence, Sample 6 does not have the properties in accordance with the embodiments.

Samples 7-9 of Comparative Example show a shorter discharge delay and less dependence of the discharge delay on the temperatures than Sample 6. However, Samples 7-9 still show a longer discharge delay and more dependence on the temperatures than Samples 1-5 because of the following reason. Although the MgO particles are included in the protective layer, those MgO particles do not have the (110) or (111) crystal face but have only the (100) crystal face because the MgO particles are formed by the gas-phase method. Thus, Samples 7-9 do not have the properties as with the MgO particles with the two or three specific crystal faces in accordance with the embodiments.

In addition, Sample 10 of Comparative Example shows a relatively short discharge delay. However, although Sample 10 shows less dependence on the temperatures or space charges than Sample 6, Sample 10 is more dependent on the temperatures or space charges than Samples 1-5.

This is because Sample 10 has the MgO particles that are achieved by burning the MgO precursor at a low temperature C). Thus, a large amount of impurity gas is absorbed in the MgO powder.

INDUSTRIAL APPLICABILITY

In view of industrial application, the PDP in accordance with the embodiments of the present invention can be applied to (i) a television used at transport or public facilities, and at home, and (ii) a display for computer, because the PDP offers the high-definition image display at a low voltage.

In addition, the PDP in accordance with the present invention is able to suppress a time lag (discharge delay) between the application of driving voltage and discharge, and the dependence of the discharge delay on temperatures even when the partial pressure of xenon is high. Thus, a high-definition television whose images are hardly influenced by temperature environment can be achieved.

The invention claimed is:

1. A plasma display panel having a first substrate and a second substrate that oppose each other with a discharge space therebetween and are sealed together around edge portions thereof, the first substrate including electrodes and a dielectric layer that are disposed thereon in the stated order, wherein
on a surface of the dielectric layer that faces the discharge space, a surface layer made of a metallic oxide is disposed, the metallic oxide being at least one selected from magnesium oxide, calcium oxide, barium oxide, and strontium oxide, and
on a surface of the surface layer that faces the discharge space, powder including one or more magnesium oxide particles each having a (100) crystal face and a (111) crystal face is disposed.

2. The plasma display panel of claim 1, wherein
part of each particle included in the powder of the magnesium oxide particles is embedded in the surface layer so that the particles are substantially exposed to discharge space.

3. The plasma display panel of claim 1, wherein
each magnesium oxide particle has a hexahedral structure with at least one truncated surface.

4. The plasma display panel of claim 3, wherein
each magnesium oxide particle has a main surface which is the (100) crystal face and the truncated surface which is the (111) crystal face.

5. The plasma display panel of claim 1, wherein
each magnesium oxide particle has an octahedral structure with at least one truncated surface.

6. The plasma display panel of claim 5, wherein
each magnesium oxide particle has a main surface which is the (111) crystal face and the truncated surface which is the (100) crystal face.

7. The plasma display panel of claim 1, wherein
each magnesium oxide particle is a tetrakaidecahedron that has six surfaces each of which is the (111) crystal face.

8. The plasma display panel of claim 7, wherein
each magnesium oxide particle has a main surface which is the (100) crystal face and the truncated surface which is the (111) crystal face.

9. The plasma display panel of claim 7, wherein
each magnesium oxide particle has a main surface which is the (111) crystal face and a truncated surface which is the (100) crystal face.

10. The plasma display panel of claim 1, wherein
the magnesium oxide particles have been formed by burning a magnesium oxide precursor.

11. The plasma display panel of claim 1, wherein
a particle diameter of each magnesium oxide particle is 300 nm or over.

12. A plasma display panel having a first substrate and a second substrate that oppose each other with a discharge space therebetween and are sealed together around edge portions thereof, the first substrate including electrodes and a dielectric layer that are disposed in the stated order, wherein
on or above a surface of the dielectric layer that faces the discharge space, powder including one or more magnesium oxide particles each having a (100) crystal face and a (111) crystal face is disposed.

13. The plasma display panel of claim 12, wherein
each magnesium oxide particle has a hexahedral structure with at least one truncated surface.

14. The plasma display panel of claim 13, wherein
each magnesium oxide particle has a main surface which is the (100) crystal face and the truncated surface which is the (111) crystal face.

15. The plasma display panel of claim 12, wherein
each magnesium oxide particle has an octahedral structure with at least one truncated surface.

16. The plasma display panel of claim 15, wherein
each magnesium oxide particle has a main surface which is the (111) crystal face and the truncated surface which is the (100) crystal face.

17. The plasma display panel of claim 12, wherein
each magnesium oxide particle is a tetrakaidecahedron that has six surfaces each of which is the (100) crystal face and eight surfaces each of which is the (111) crystal face.

18. The plasma display panel of claim 17, wherein
each magnesium oxide particle has a main surface which is the (100) crystal face and a truncated surface which is the (111) crystal face.

19. The plasma display panel of claim 17, wherein
each magnesium oxide particle has a main surface which is the (111) crystal face and a truncated surface which is the (100) crystal face.

20. The plasma display panel of claim 12, wherein
the magnesium oxide particles have been formed by burning a magnesium oxide precursor.

21. The plasma display panel of claim 12, wherein
a particle diameter of each magnesium oxide particle is 300 nm or over.

* * * * *